(12) United States Patent
Jiang et al.

(10) Patent No.: US 9,584,271 B2
(45) Date of Patent: Feb. 28, 2017

(54) METHOD AND DEVICE FOR SPECTRUM SENSING IN COGNITIVE RADIO SYSTEM

(71) Applicant: China Academy of Telecommunications Technology, Beijing (CN)

(72) Inventors: Chenggang Jiang, Beijing (CN); Yuanyuan Li, Beijing (CN); Wenling Bai, Beijing (CN); Yu Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 186 days.

(21) Appl. No.: 14/411,804

(22) PCT Filed: Jun. 7, 2013

(86) PCT No.: PCT/CN2013/076916
§ 371 (c)(1),
(2) Date: Dec. 29, 2014

(87) PCT Pub. No.: WO2014/000560
PCT Pub. Date: Jan. 3, 2014

(65) Prior Publication Data
US 2015/0139049 A1    May 21, 2015

(30) Foreign Application Priority Data
Jun. 29, 2012   (CN) ........................ 2012 1 0220200

(51) Int. Cl.
*H04L 5/00* (2006.01)
*H04L 5/14* (2006.01)
*H04W 16/14* (2009.01)

(52) U.S. Cl.
CPC .............. *H04L 5/0007* (2013.01); *H04L 5/14* (2013.01); *H04W 16/14* (2013.01)

(58) Field of Classification Search
None
See application file for complete search history.

(56) References Cited

U.S. PATENT DOCUMENTS

| 2007/0042733 A1* | 2/2007 | Tomioka | H04W 48/18 455/179.1 |
| 2009/0111388 A1* | 4/2009 | Chen | H04W 16/14 455/70 |

(Continued)

FOREIGN PATENT DOCUMENTS

| CN | 101150871 | 3/2008 |
| CN | 101257698 | 9/2008 |

(Continued)

OTHER PUBLICATIONS

International Search Report for PCT/CN2013/076916 mailed Sep. 12, 2013.

(Continued)

*Primary Examiner* — Kodzovi Acolatse
(74) *Attorney, Agent, or Firm* — Foley & Lardner LLP; James F. Ewing; Paul M. H. Pua

(57) ABSTRACT

The cognitive radio cell acquires a scheme dividing frequency band resources into a number of sub-bands and corresponding silent period time frequency pattern, when performing silence on the sub-band which the cognitive radio cell works on according to the silence period time position of each sub-band defined in the silent period time frequency pattern, spectrum sensing on corresponding sub-band is implemented by radio spectrum sensing system or cognitive radio cell.

16 Claims, 6 Drawing Sheets

(56) References Cited

U.S. PATENT DOCUMENTS

| | | | | |
|---|---|---|---|---|
| 2009/0274081 | A1* | 11/2009 | Kwon | H04W 16/14 370/311 |
| 2011/0124291 | A1* | 5/2011 | Gurney | H04W 16/14 455/63.2 |
| 2012/0076106 | A1 | 3/2012 | Bhattad et al. | |

FOREIGN PATENT DOCUMENTS

| | | |
|---|---|---|
| CN | 102281541 | 12/2011 |
| WO | WO-2007/096819 | 8/2007 |
| WO | WO-2008/090509 | 7/2008 |
| WO | WO-2009/069069 | 6/2009 |
| WO | WO-2012/060756 | 5/2012 |

OTHER PUBLICATIONS

"IEEE Standard for Information Technology—Telecommunications and information exchange between systems Wireless Regional Area Networks (WRAN)—Specific requirements Part 22: Cognitive Wireless RAN Medium Access Control (MAC) and Physical Layer (PHY) Specifications: Policies and Procedures for Operation", IEEE Standard, IEEE, Piscataway, NJ, USA, Jul. 1, 2011, pp. 1-680, XP017694556, ISBN: 978-0-7381-6723-7.

Carlos Cordeiro et al: 11 Spectrum Sensing for Dynamic Spectrum Access of TV Bands, Cognitive Radio Oriented Wireless Networks and Communications, 2007. Crowncom 2007. 2nd International Conference on, IEEE, Piscataway, NJ, USA, Aug. 1, 2007, pp. 225-233, XP031276051, ISBN: 978-1-4244-0814-6 * abstract *.

Partial Supplementary European Search Report for EP Application No. 13809438.8 mailed Sep. 22, 2015.

"IEEE Standard for Information Technology—Telecommunications and information exchange between systems Wireless Regional Area Networks (WRAN)—Specific requirements Part 22: Cognitive Wireless RAN Medium Access Control (MAC) and Physical Layer (PHY) Specifications: Policies and Procedures for Operati", IEEE Standard, IEEE, Piscataway, NJ, USA, Jul. 1, 2011, pp. 1-680, XP017694556, ISBN: 978-0-7381-6723-7 * p. 13-p. 36; figures 2,5,11-13; table 1* * p. 237-p. 249; figures 107, 110, 111 *.

Carlos Cordeiro et al: "Spectrum Sensing for Dynamic Spectrum Access of TV Bands", Cognitive Radio Oriented Wireless Networks and Communications, 2007. Crowncom 2007. 2nd International Conference on, IEEE, Piscataway, NJ, USA, Aug. 1, 2007, pp. 225-233, XP031276051, ISBN: 978-1-4244-0814-6 * abstract *.

Office Action for Chinese Patent Application No. 201210220200.9 mailed Nov. 3, 2015.

* cited by examiner

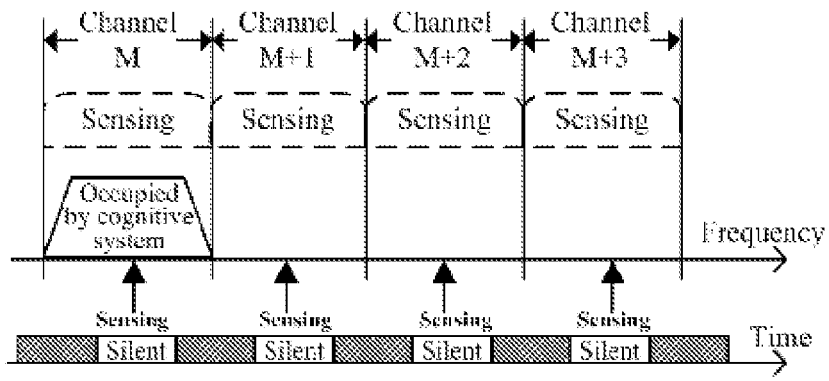

Fig.4

A cognitive radio spectrum sensing system divides frequency band resources into a plurality of sub-bands and notifies respective cognitive radio cells of the division into the sub-bands and a corresponding time-frequency pattern of silence periods — S501

When the cognitive radio spectrum sensing system has the respective cognitive radio cells silent in sub-bands, where the cognitive radio cells operate, according to the silence period temporal locations of the respective sub-bands defined in the time-frequency pattern of silence periods, the cognitive radio spectrum sensing system performs spectrum sensing on the respective sub-bands — S502

Fig.5

METHOD AND DEVICE FOR SPECTRUM SENSING IN COGNITIVE RADIO SYSTEM

The present application is a US National Stage of International Application No. PCT/CN2013/076916, filed Jun. 7, 2013, designating the United States, and claiming the benefit of Chinese Patent Application No. 201210220200.9, filed with the Chinese Patent Office on Jun. 29, 2012 and entitled "Method and device for spectrum sensing in cognitive radio system", which are hereby incorporated by reference in their entireties.

FIELD

The present invention relates to the field of communication technologies and particularly to a method and device for spectrum sensing in a cognitive radio system.

BACKGROUND

There has been an increasingly distinct contradiction between an increasing demand for broadband radio communication and a limited amount of spectrum resources along with rapid development in the industry of mobile communications, and although Orthogonal Frequency Division Multiplexing (OFDM), Multiple Input Multiple Output (MIMO) and other technologies have been adopted in the Long Term Evolution (LTE), these have failed to address the problem of the limited amount of spectrum resources thoroughly.

Telecommunication operators will be faced with a more serious problem of the scarce spectrum resources along with rapid development of mobile services in future, and on the other hand, the spectrum use of some radio systems has been almost left idle temporally and geographically, for example, many of radio and television bands have been left idle all the time because a transmission capacity can be improved greatly by digital transmission along with evolvement of radio and television systems from analog transmission to digital transmission, thus wasting the precious radio resources, whereas many of the other radio systems have also been proved to have their spectrums underutilized.

SUMMARY

Embodiments of the invention provide a method and device for spectrum sensing in a cognitive radio system so as to address such a problem with a solution to spectrum sensing in the prior art that a number of silence periods are required and the throughput of the system may be degraded due to silence processing.

In order to attain the object above, an embodiment of the invention in an aspect provides a method for spectrum sensing in a cognitive radio system, the method including at least the following operations:

dividing, by a cognitive radio spectrum sensing system, frequency band resources into a plurality of sub-bands and notifying respective cognitive radio cells of the division into the sub-bands and a corresponding time-frequency pattern of silence periods; and when the cognitive radio spectrum sensing system has the respective cognitive radio cells silent in sub-bands, where the cognitive radio cells operate, according to silence period temporal locations of respective sub-bands defined in the time-frequency pattern of silence periods, performing, by the cognitive radio spectrum sensing system, spectrum sensing on the respective sub-bands.

In another aspect, an embodiment of the invention further provides a network device applicable to a cognitive radio system, the network device including:

a dividing module configured to divide frequency band resources into a plurality of sub-bands;

a transmitting module configured to notify respective cognitive radio cells of the division into the sub-bands, and a corresponding time-frequency pattern of silence periods, determined in response to the dividing instruction;

a silence module configured to have the respective cognitive radio cells silent in sub-bands, where the cognitive radio cells operate, according to silence period temporal locations of the respective sub-bands defined in the time-frequency pattern of silence periods; and a sensing module configured to perform spectrum sensing on the respective sub-bands when silence is enforced in response to the silence instruction.

In still another aspect, an embodiment of the invention further provides a method for spectrum sensing in a cognitive radio system, the method including at least the following operations:

obtaining, by respective cognitive radio cells, division into sub-bands and a corresponding time-frequency pattern of silence periods; and enforcing, by the respective cognitive radio cells, silence in sub-bands, where the cognitive radio cells operate, according to silence period temporal locations of respective sub-bands defined in the corresponding time-frequency pattern of silence period to perform spectrum sensing on the corresponding sub-bands.

In a further aspect, an embodiment of the invention further provides a network device applicable to a cognitive radio cell in a cognitive radio system, the network device including:

an obtaining module configured to obtain division into sub-bands and a corresponding time-frequency pattern of silence periods; and a silence module configured to enforce silence in a sub-band, where a cognitive radio cell operates, according to silence period temporal locations of the respective sub-bands defined in the corresponding time-frequency pattern of silence periods to perform spectrum sensing on the corresponding sub-band.

The technical solution according to the embodiments of the invention has the following advantages over the prior art:

With an application of the technical solution according to the embodiments of the invention, cognitive radio cells obtain the division of frequency band resources into sub-bands and a corresponding time-frequency pattern of silence periods, and the cognitive radio cells are silent in sub-bands, where the cognitive radio cells operates, according to silence period temporal locations of the respective sub-bands defined in the time-frequency pattern of silence periods, so that the cognitive radio spectrum sensing system or the respective cognitive radio cells perform spectrum sensing on the corresponding sub-bands, and thus in an environment where a plurality of cognitive radio cells are deployed in a network, the uniform time-frequency pattern of silence periods and strategy of spectrum sensing are applicable to the plurality of cognitive cells in this method so that spectrum sensing can be avoided effectively from interference of the present cognitive cell and another adjacent cognitive cell or cells in the event that there are a plurality of cognitive cells; and the frequency band resources are divided into the sub-bands, and both silence is enforced and spectrum sensing is performed respectively in the sub-bands, so that the number of silence periods required for spectrum sensing can be lowered effectively to thereby improve the throughput of the cognitive radio system.

BRIEF DESCRIPTION OF THE DRAWINGS

FIG. 4 is a schematic diagram of spectrum sensing in a limited band range;

FIG. 5 is a schematic flow chart of a method for spectrum sensing in a cognitive radio system according to an embodiment of the invention;

DETAILED DESCRIPTION

In order to address the problem of a limited amount of spectrum resources, a new radio technology, i.e., the technology of Cognitive Radio (CR), has gained popular attention. The technology of cognitive radio is a working approach to address the existing scarcity of spectrum resources. Cognitive radio is an intelligent radio communication system which can sense a surrounding environment, learn from the environment through human intelligence and alter some operating parameters (e.g., transmit power, a carrier frequency, a modulation scheme, etc.) in real-time to thereby adapt its internal state to a varying statistical characteristic of a received radio signal for the effects of highly-reliable communication available anytime and anywhere and of efficient use of spectrum resources.

In order to attain the object above, cognitive radio performs the entire cognitive process in a cognitive loop including the following three operations:

(1) Spectrum sensing is performed so that an input Radio Frequency (RF) stimulating signal is analyzed to detect idle spectrums.

(2) A spectrum analysis is made so that a result of spectrum sensing and other radio input signals are analyzed to estimate channel state information and predicate a channel capacity.

(3) A spectrum decision is made so that a final decision on spectrum use, including a decision on frequencies, bandwidths, transmit power, modulation schemes, etc., is made from both the idle spectrum resources as a result of spectrum sensing and a result of the spectrum analysis.

Figure 1:
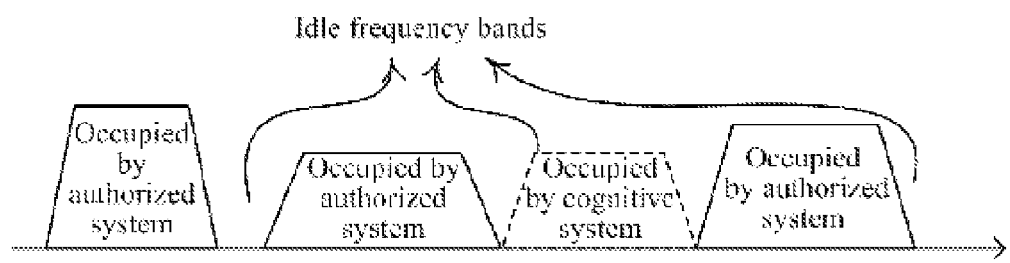
FIG. 1 is a schematic diagram of the use of spectrums in cognitive radio.

Different services can be assigned with fixed frequency ranges, for example, broadcast services are specified at frequencies distributed in the Medium Frequency (MF) range, the High Frequency (HF) range, the Very High Frequency (VHF) range or the low Ultra High Frequency (UHF) range, and mobile services are specified at frequencies distributed in the high Ultra High Frequency (UHF) range and the Super High Frequency (SHF) range. A system authorized to operate in some frequency range is referred to as an authorized system, but the authorized system may not access the entire assigned frequency range so that a number of bands may be idle. The cognitive radio system has the idle spectrum resources opportunistically accessible with opportunistic use thereof whenever possible, and FIG. 1 illustrates a schematic diagram of the use of spectrums in cognitive radio.

With spectrum sensing in cognitive radio, idle spectrum resources are detected by detecting a binary signal per band, and generally the technology of spectrum sensing is a technology to detect a signal. There is some required sensing sensitivity for spectrum sensing, that is, power of a received signal to be detected is higher than the required sensing sensitivity so that the signal can be detected, which ensures the authorized system to be insusceptible to unwanted interference.

On one hand, spectrum sensing needs to sense periodically a current operating frequency of the cognitive system to thereby detect an operating state of the authorized system at that frequency. As mentioned above, however, spectrum sensing needs to be able to detect a weak signal of the authorized system, which necessitates good performance of spectrum sensing to detect in a low Signal to Noise power Ratio or simply Signal to Noise Ratio (SNR) environment. However spectrum sensing in such a low SNR environment may be susceptible to interference. If the cognitive system is also operating in the course of spectrum sensing, then spectrum sensing may be susceptible to serious interference of the present cognitive system so that the accuracy of spectrum sensing may be lowered greatly and consequentially the performance of the cognitive system may be degraded. As a result an operating frequency of the cognitive system needs to be sensed while keeping the cognitive system silent.

On the other hand, spectrum sensing needs to periodically sense other frequencies (including a non-operating frequency of the cognitive system) to thereby obtain information about spare idle spectrums. Spectrum sensing does not need to be performed while keeping the cognitive system silent because a non-operating frequency of the cognitive system may be sensed without interference of the present cognitive system.

Figure 2:
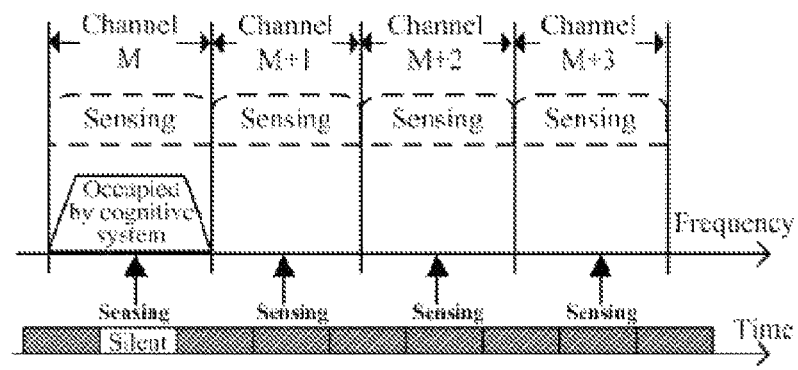
FIG. 2 is a schematic diagram of sensing for an operating frequency and a non-operating frequency in cognitive radio.

FIG. 2 illustrates a schematic diagram of sensing for an operating frequency and a non-operating frequency in cognitive radio.

For the cognitive radio system, respective cognitive radio cells are capable of accessing spectrums dynamically so that in an environment where there are a plurality of cognitive cells, the respective cognitive cells may select appropriate frequencies to operate at according to their local radio environments so that it is very like for them to operate at different frequencies. In the event that a plurality of cognitive cells are deployed in a network, spectrum sensing for a non-operating frequency may be susceptible to interference of a system operating adjacent to the frequency to be sensed, thus degrading the performance of spectrum sensing.

As illustrated in FIG. 2, when the cognitive system operates over a channel M, the cognitive system operates normally in periods T1 and T3, that is, a cognitive radio cell transmits a message over an uplink channel and a downlink channel corresponding to the channel M, and when spectrum sensing is performed on the channel M in a period T2, the cognitive system is silent in order to avoid spectrum sensing in the cognitive system from being susceptible to interference of the present cognitive system in operation. When the present cognitive system performs spectrum sensing on the channel M+1 in a period T4 or performs spectrum sensing on the channel M+2 in a period T5 or performs spectrum sensing on the channel M+3 in a period T6, if there is an adjacent cognitive system operating normally in the period T4 or T5 or T6, then spectrum sensing in the present cognitive system on the channel M+1 or the channel M+2 or the channel M+3 may be susceptible to interference of the adjacent cognitive system.

Figure 3:
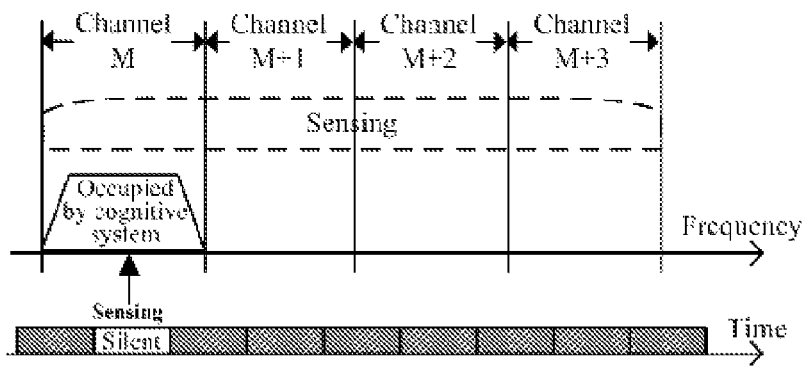
FIG. 3 is a schematic diagram of spectrum sensing in a wideband range.

In order to avoid the interference above in the event that there are a plurality of cognitive cells, two strategies are generally adopted as follows:

(1) Spectrum sensing is performed as sensing in a wideband range, that is, spectrum sensing for all the bands is performed in silence periods of network synchronization, and FIG. 3 illustrates a schematic diagram of spectrum sensing in a wideband range. In the scenario illustrated in FIG. 3, there is such a high operating capacity of the cognitive system that spectrum sensing can be performed on the channel M, the channel M+1, the channel M+2 and the channel M+3 in the period T2, i.e., a period in which the present cognitive system is silent. However, if there is an adjacent cognitive system operating normally in the period T2, then spectrum sensing in the present cognitive system on the channel M, the channel M+1, the channel M+2 and the channel M+3 may still be susceptible to interference of the adjacent cognitive system.

(2) A silence period of network synchronization is set for sensing in each band, and spectrum sensing of respective frequencies is performed in the respective silence periods, and FIG. 4 illustrates a schematic diagram of spectrum sensing in a limited band range. In the scenario illustrated in FIG. 4, the present cognitive system is silent in the four periods T1, T2, T3 and T4 in order to avoid interference of the present cognitive system to spectrum sensing by another adjacent cognitive system on the channel M.

In an environment where a number of cognitive radio cells are deployed in a network, spectrum sensing may be susceptible to interference of an adjacent cognitive system. With spectrum sensing in a wideband range, on one hand, a wideband signal can only be received with powerful radio frequency and intermediate-frequency processing components; and on the other hand, the wideband signal can only be processed with a high-speed baseband processing component. In the cognitive radio system, spectrum sensing may need to be performed in bands with a hundred MHz bandwidth or more and even some inconsecutive bands, which will greatly complicate a design of the receiver front-end and the baseband processing component and increase the cost of the device.

If spectrum sensing in each band is performed as sensing in a silence period, then the cognitive system cannot transmit a signal in the silence period, which will greatly consume a communication capacity of the cognitive system and lower the throughput of the cognitive system.

Furthermore, there has been absent a cooperative strategy, so it may be difficult to perform some dynamically triggered spectrum sensing with the traditional setting of silence periods and strategies of spectrum sensing.

As mentioned in the Background of the Invention, telecommunication operators will be faced with the problem of scarce spectrum resources along with rapid development of mobile communication services, and cognitive radio is considered as a working approach to address the existing scarcity of spectrum resources. It obtains idle frequency band resources available at the current location through spectrum sensing and other means to obtain information about a spectrum environment and accesses the idle bands opportunistically to thereby improve the efficiency of accessing the spectrums and alleviate the condition of the scarce spectrum resources. However spectrum sensing may be susceptible to radio interference of the cognitive system in operation, and in an environment where a plurality of cognitive cells are deployed in a network, spectrum sensing may also be susceptible to interference of an adjacent cognitive radio system, thus deteriorating performance of spectrum sensing so that spectrum sensing may fail to be satisfactory to cognitive radio as a result.

In order to overcome such a drawback, embodiments of the invention propose a method for spectrum sensing in a cognitive radio system, and in an environment where a plurality of cognitive cells are deployed in a network, a uniform time-frequency pattern of silence periods and a uniform strategy of spectrum sensing are applicable to the plurality of cognitive cells in this method so that spectrum sensing can be avoided effectively from interference of the present cognitive cell and another adjacent cognitive cell or cells in the event that there are a plurality of cognitive cells. As compared with the traditional strategy of setting silence periods and mechanism of spectrum sensing, the number of silence periods required for spectrum sensing can be lowered effectively with the method to thereby improve the throughput of the cognitive radio system.

In a particular implementation scenario, this method can be applicable to some event-triggered spectrum sensing in addition to spectrum sensing in a fixed periodicity.

FIG. 5 illustrates a schematic flow chart of a method for spectrum sensing in a cognitive radio system according to an embodiment of the invention, the method particularly including the following operations:

In the operation S501, a cognitive radio spectrum sensing system divides frequency band resources into a plurality of sub-bands and notifies respective cognitive radio cells of the method of the division into the sub-bands and a corresponding time-frequency pattern of silence periods.

In a real application scenario, this operation is performed particularly in the following two implementations:

In a first implementation, the cognitive radio spectrum sensing system divides the frequency band resources into the plurality of sub-bands according to preset parameters related to the time-frequency pattern of silence periods and notifies the respective cognitive radio cells of the division into the sub-bands and the corresponding time-frequency pattern of silence periods.

In a second implementation, the cognitive radio spectrum sensing system obtains the parameters related to the time-frequency pattern of silence periods by receiving a control message transmitted by a centralized logical entity, divides the frequency band resources into the plurality of sub-bands according to the parameters related to the time-frequency pattern of silence periods and notifies the respective cognitive radio cells of the division into the sub-bands and the corresponding time-frequency pattern of silence periods.

In a real application, either of the implementations above to be applied can be decided as needed in reality without departing from the scope of the invention.

It shall be noted that in whichever of the implementations above, the parameters related to the time-frequency pattern of silence periods include at least the periodicity of silence periods, the widths of the sub-bands, starting locations of the silence periods corresponding to the respective sub-bands, and ending locations of the silence periods corresponding to the respective sub-bands.

Furthermore the cognitive radio spectrum sensing system divides the frequency band resources into the plurality of sub-bands particularly under the following rules:

(1) The respective sub-bands as a result of the division do not intersect with each other.

(2) The union of resources corresponding to the respective sub-bands as a result of the division is frequency band resources over which the respective cognitive radio cell may operate.

The widths of the respective sub-bands as a result of the division are the same or different.

It shall be noted that the time-frequency pattern of silence periods particularly defines silence period temporal locations of the respective sub-bands in at least one sensing periodicity, where the silence period temporal locations of the respective sub-bands do not overlap with each other, and the temporal lengths of the silence periods corresponding to the silence period temporal locations of the respective sub-bands are the same or different.

Furthermore in a particular implementation scenario, the time-frequency pattern of silence periods particularly includes the following three types:

A first type is a statically configured time-frequency pattern of silence periods.

That is, all the locations of the silence periods are well preset, and when the current instance of time comes into an interval of time corresponding to the temporal location of a silence period, the silence period is triggered directly.

A second type is a dynamically configured time-frequency pattern of silence periods.

That is, alike the locations of the silence periods are well preset, but they can only become effect upon being triggered by some event.

After the trigger event occurs, if the current instance of time comes into an interval of time corresponding to the temporal location of a silence period, then the silence period is triggered directly; otherwise, in the event that no trigger event occurs, even if the current instance of time comes into an interval of time corresponding to the temporal location of a silence period, the silence period will not be triggered, A third type is a time-frequency pattern of silence periods configured in hybrid.

That is, the time-frequency pattern of silence periods includes both setting of statically configured silence periods and setting of dynamically configured silence period, where all the locations of the silence periods are well preset, and for the setting of the statically configured silence periods, as long as the current instance of time comes into an interval of time corresponding to the temporal location of a silence period, the silence period will be triggered directly, whereas for the setting of the dynamically configured silence period, that is, for silence period temporal locations in a dynamical sensing periodicity, they can only become effect upon being triggered by some event, and for a particular implementation of triggering, reference can be made to the implementation above of triggering a silence period in a dynamically configured time-frequency pattern of silence periods, so a repeated description thereof will be omitted here.

In the operation S502, when the cognitive radio spectrum sensing system has the respective cognitive radio cells silent in sub-bands, where the cognitive radio cells operate, according to the silence period temporal locations of the respective sub-bands defined in the time-frequency pattern of silence periods, the cognitive radio spectrum sensing system performs spectrum sensing on the respective sub-bands.

In correspondence to the three types of the time-frequency pattern of silence periods in the operation S501 above, alike a silence process can be performed in this operation in the following three implementations:

In a first implementation, the time-frequency pattern of silence periods is particularly a statically configured time-frequency pattern of silence periods.

When the cognitive radio spectrum sensing system determines from the time-frequency pattern of silence periods that the current instance of time is a silence period temporal location corresponding to a sub-band or sub-bands where one or more cognitive radio cells operate, the cognitive radio spectrum sensing system has the cognitive radio cell or cells silent in an interval of time corresponding to the silence period temporal location in the sub-band or sub-bands where the cognitive radio cell or cells operate.

In a second implementation, the time-frequency pattern of silence periods is particularly a statically configured time-frequency pattern of silence periods.

When the cognitive radio spectrum sensing system transmits to a cognitive radio cell a request for spectrum sensing on a sub-band where the cognitive radio cell operates, the cognitive radio spectrum sensing system determines from the time-frequency pattern of silence periods one or more silence period temporal locations corresponding to the sub-band after the current instance of time; and The cognitive radio spectrum sensing system has the cognitive radio cell silent in an interval or intervals of time corresponding to the one or more silence period temporal locations in the sub-band where the cognitive radio cell operates;

When the cognitive radio spectrum sensing system determines from the time-frequency pattern of silence periods that the current instance of time is a silence period temporal location corresponding to a sub-band where a cognitive radio cell operates, if the cognitive radio spectrum sensing system has not previously transmitted a request for spectrum sensing on the sub-band to the cognitive radio cell, that is, when a corresponding trigger condition is not satisfied, then the cognitive radio spectrum sensing system gives up having the cognitive radio cell silent in an interval of time corresponding to the silence period temporal location in the sub-band where the cognitive radio cell operates but has the cognitive radio cell continue with normal operation in the sub-band.

In a third implementation, the time-frequency pattern of silence periods is particularly a time-frequency pattern of silence periods configured in hybrid.

Firstly the cognitive radio spectrum sensing system identifies a dynamic sensing periodicity configured in the hybrid configuration scheme;

When the cognitive radio spectrum sensing system determines from the time-frequency pattern of silence periods that the current instance of time is a silence period temporal location outside of the dynamic sensing periodicity corresponding to a sub-band where a cognitive radio cell operates, the cognitive radio spectrum sensing system has the cognitive radio cell silent in an interval of time corresponding to the silence period temporal location in the sub-band where the cognitive radio cell operates;

When the cognitive radio spectrum sensing system transmits to a cognitive radio cell a request for spectrum sensing on a sub-band where the cognitive radio cell operates, the cognitive radio spectrum sensing system determines from the time-frequency pattern of silence periods one or more silence period temporal locations in the dynamic sensing periodicity corresponding to the sub-band after the current instance of time, and the cognitive radio spectrum sensing system has the cognitive radio cell silent in an interval or intervals of time corresponding to the one or more silence period temporal locations in the sub-band where the cognitive radio cell operates; and When the cognitive radio spectrum sensing system determines from the time-frequency pattern of silence periods that the current instance of time is a silence period temporal location in the dynamic sensing periodicity corresponding to a sub-band or sub-bands where one or more cognitive radio cells operate, if the cognitive radio spectrum sensing system has not previously transmitted a request for spectrum sensing on the sub-band or sub-bands to the cognitive radio cell or cells, then the cognitive radio spectrum sensing system gives up having the cognitive radio cell or cells silent in an interval of time corresponding to the silence period temporal location in the sub-band or sub-bands where the cognitive radio cell or cells operate but has the cognitive radio cell or cells continue with normal operation in the sub-band or sub-bands.

It shall be noted that in the silence process in any of the implementations above, operations in the silence process performed by the cognitive radio spectrum sensing system are particularly as follows:

The cognitive radio spectrum sensing system instructs the cognitive radio system to stop a message from being transmitted to the cognitive radio cell in the sub-band in the interval of time corresponding to the silence period temporal location of the sub-band.

It shall be noted that the technical solution according to the embodiments of the invention can be widely applicable to various types of systems:

When the cognitive radio cell operates in a TDD system, the cognitive radio cell occupies one or more sub-bands.

When the cognitive radio cell operates in an FDD system, the cognitive radio cell occupies one or more sub-bands.

When the cognitive radio cell operates in an FDD system, an uplink channel and a downlink channel in the cognitive radio cell occupy one or more sub-bands respectively.

Furthermore when the cognitive radio cell operates in a multi-carrier system, respective carriers occupy one or more sub-bands respectively.

On the other hand, at the cognitive radio cell side, the cognitive radio cells need to obtain the division into the sub-bands and the corresponding time-frequency pattern of silence periods and to be silent in sub-bands, where the cognitive radio cells operate, according to the silence period temporal locations of the respective sub-bands defined in the corresponding time-frequency pattern of silence periods, and a corresponding silent rule is similar to that in the operation S502 above, so a repeated description thereof will be omitted here except that particularly in the silence process at the cognitive radio cell side, the cognitive radio cell stops a message from being transmitted over an uplink channel and a downlink channel corresponding to the sub-band in an interval of time corresponding to a silence period temporal location of the sub-band, unlike the process at the cognitive radio spectrum sensing system side.

It shall be further noted that the division into the sub-bands and the corresponding time-frequency pattern of silence periods can be obtained at the cognitive radio cell side in the following two implementations:

In a first implementation, the respective cognitive radio cells receive the division into the sub-bands and the corresponding time-frequency pattern of silence periods notified of by the cognitive radio spectrum sensing system, where the cognitive radio spectrum sensing system divides the frequency band resources into the plurality of sub-bands.

That is, the division into the sub-bands is performed by the cognitive radio spectrum sensing system.

In a second implementation, the respective cognitive radio cells determine the division into the sub-bands and the corresponding time-frequency pattern of silence periods directly under a preset rule.

That is, the division into the sub-bands is performed directly by the cognitive radio cells under a corresponding rule which can be particularly a standard or preset division rule.

Furthermore a corresponding process of spectrum sensing can also be performed in two implementations, that is, it can be performed by the cognitive radio spectrum sensing system or performed directly by the respective cognitive radio cells (e.g., base stations of the cognitive radio cells).

In a real application scenario, particularly the corresponding function can be deployed on network devices (e.g., base stations) corresponding to the particular cognitive radio cells or performed by the separate cognitive radio spectrum sensing system as needed for a particular system without departing from the scope of the invention.

The technical solution according to the embodiments of the invention has the following advantages over the prior art:

With an application of the technical solution according to the embodiments of the invention, cognitive radio cells obtain the division of frequency band resources into sub-bands and a corresponding time-frequency pattern of silence periods, and the cognitive radio cells are silent in sub-bands, where the cognitive radio cells operates, according to silence period temporal locations of the respective sub-bands defined in the time-frequency pattern of silence periods, so that the cognitive radio spectrum sensing system or the respective cognitive radio cells perform spectrum sensing on the corresponding sub-bands, and thus in an environment where a plurality of cognitive radio cells are deployed in a network, the uniform time-frequency pattern of silence periods and strategy of spectrum sensing are applicable to the plurality of cognitive cells in this method so that spectrum sensing can be avoided effectively from interference of the present cognitive cell and another adjacent cognitive cell or cells in the event that there are a plurality of cognitive cells; and the frequency band resources are divided into the sub-bands, and both silence is enforced and spectrum sensing is performed respectively in the sub-bands, so that the number of silence periods required for spectrum sensing can be lowered effectively to thereby improve the throughput of the cognitive radio spectrum sensing system.

The technical solution according to the embodiments of the invention will be described below in connection with particular application scenarios.

Embodiments of the invention propose a method for cooperative radio silence and spectrum sensing by a plurality of cognitive radio cells, and a uniform time-frequency pattern of silence periods and a uniform strategy of spectrum sensing are applicable to the plurality of cognitive cells in this method so that spectrum sensing can be avoided effectively from interference of the present cognitive cell and another adjacent cognitive cell or cells in the event that there are a plurality of cognitive cells; and as compared with the traditional mechanism of sensing, the number of silence periods can be lowered effectively to thereby improve the throughput of the cognitive radio system.

Both spectrum sensing in a fixed periodicity and some event-triggered spectrum sensing can be performed in this method.

The following three situations can exist with the different particular implementations of the time-frequency pattern of silence periods:

A first situation relates to a static configuration of a time-frequency pattern of silence periods together with a sensing mode.

In this situation, a uniform time-frequency pattern of silence periods is applicable to a plurality of cognitive radio cells which are silent at silence period temporal locations and a silence period temporal location of a CR cell correspond to an operating frequency of the cell.

A particular processing rule involves the following several aspects:

(1) A band available to a CR cell is divided into K sub-bands, and the respective sub-bands do not overlap with each other, that is, frequencies of the sub-bands do not overlap with each other, and the K sub-bands constitute a set 0.

A particular rule of the division into the sub-bands can be the division into the respective sub-bands which are sub-bands with equal bandwidths or sub-bands with unequal bandwidths.

The particular division into the sub-bands can be performed by the cognitive radio spectrum sensing system or by the cognitive radio cell, and reference can be made to the description above for details thereof, so a repeated description thereof will be omitted here.

(2) A silent location of the CR cell operating in the k-th sub-band is at the k-th temporal location, where {the k-th sub-band E the set 0}, and the k-th temporal location is defined as needed, but the different k-th temporal locations will not temporally overlap with each other;

Temporal lengths of time for silence at different silent temporal locations can be the same length or can be different lengths.

(3) If the CR cell occupies a plurality of sub-bands, then the CR cell needs to be silent at all the corresponding silent locations in the occupied plurality of sub-bands or may be silent separately at only the respective sub-bands where the cognitive radio cell operates, that is, the a signal of the CR cell operating in the k-th sub-band needs to be silent at the k-th temporal location.

(4) A silence period temporal location as referred to in this embodiment is the location of an absolute period of time, that is, all the CR cells are silent synchronously for the absolute period of time.

(5) The silence process above means that the CR system will not transmit any information in an operating band for a temporal range corresponding to a silence period temporal location and for the respective particular corresponding CR cells, no information will be transmitted in the uplink and the downlink of the CR cell for the silent temporal range.

For periodical spectrum sensing, the CR cell needs to perform periodical spectrum sensing, and a silence period temporal location of the CR cell corresponds to an operating frequency of the cell in each silence periodicity.

(6) Spectrum sensing of some frequency in any CR cell is performed at a silence period temporal location corresponding to the frequency particularly as follows:

Spectrum sensing on the k-th sub-band is performed in a silence period at the k-th temporal location.

For periodical spectrum sensing, spectrum sensing on the k-th sub-band in each sensing periodicity is performed in a silence period at the k-th temporal location in the sensing periodicity.

Figure 6:
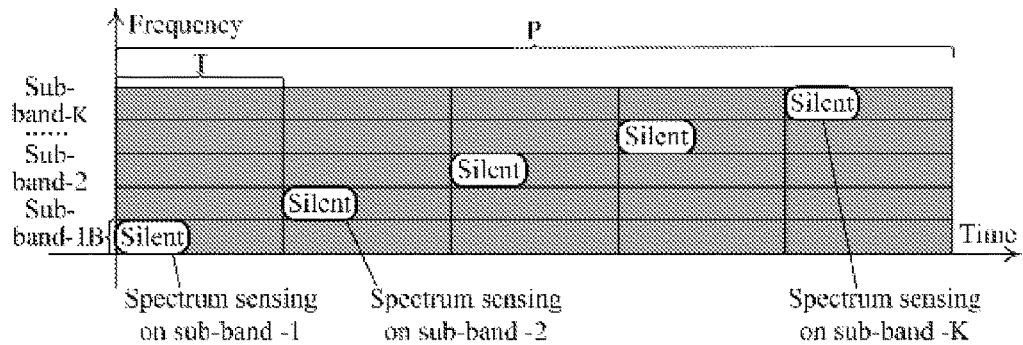
FIG. 6 is a schematic diagram of a static configuration of a time-frequency pattern of silence periods in a particular application scenario according to an embodiment of the invention.
Figure 7:
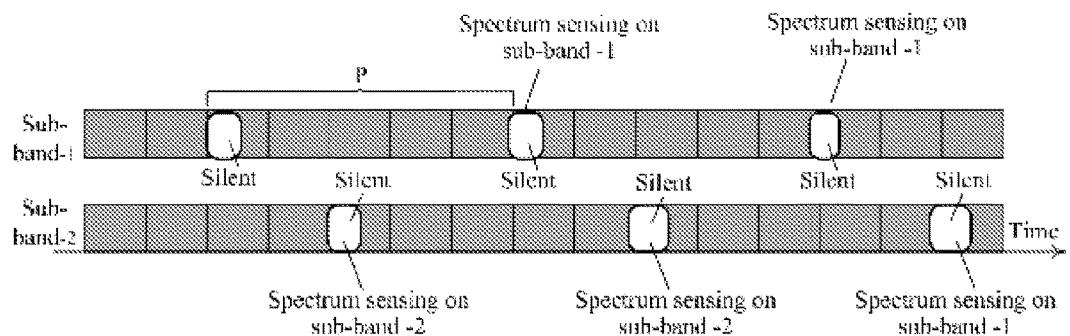
FIG. 7 is a schematic diagram of a static configuration of a time-frequency pattern of silence periods in another particular application scenario according to an embodiment of the invention.

Under the rule above, FIG. 6 is a schematic diagram of a static configuration of a time-frequency pattern of silence periods in a particular application scenario according to an embodiment of the invention, and FIG. 7 is a schematic diagram of a static configuration of a time-frequency pattern of silence periods in another particular application scenario according to an embodiment of the invention;

P represents a sensing periodicity, B represents the bandwidth of a sub-band, and T represents the interval of time between two silence periods in the sensing periodicity.

A second situation relates to a dynamic configuration of a time-frequency pattern of silence periods together with a sensing mode.

A particular configuration of a time-frequency pattern of silence periods can be adopted also as illustrated in FIG. 6 or FIG. 7 except that whether the CR cell is silent is decided by the following conditions:

(1) Normally the CR cell does not need to be silent in each periodicity of silence periods.

(2) Silence is enforced as described in the first situation above in one or more subsequent periodicities of silence periods upon reception of a request for silence at some frequency.

It shall be noted that the "request for silence at some frequency" above may include a request for dynamic spectrum sensing in the present cell or a request for dynamic spectrum sensing in an adjacent cell but will not be limited to these two scenarios, and the setting above of silence periods can be triggered by any request for dynamic spectrum sensing at some frequency.

After the corresponding silence process is triggered as described above, the cognitive radio spectrum sensing system or the CR cell itself can perform spectrum sensing at the corresponding frequency.

Figure 8:
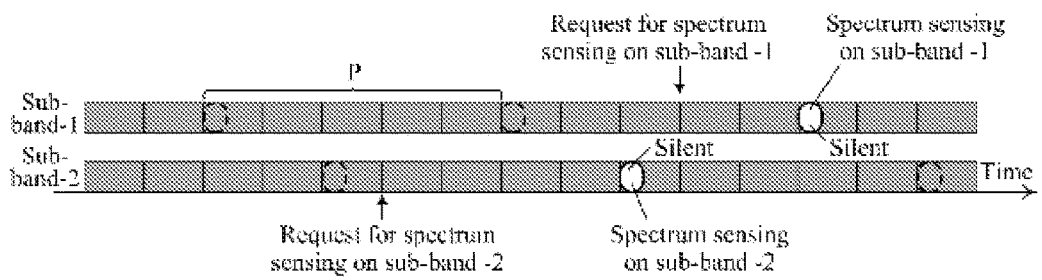
FIG. 8 is a schematic diagram of a dynamic configuration of a time-frequency pattern of silence periods in a particular application scenario according to an embodiment of the invention.

Under the rule above, in correspondence to FIG. 7 above, FIG. 8 illustrates a schematic diagram of a dynamic configuration of a time-frequency pattern of silence periods in a particular application scenario according to an embodiment of the invention.

In this situation, a corresponding silence process and spectrum sensing can only be performed upon reception of a corresponding request for spectrum sensing.

A third situation relates to a hybrid configuration of silence periods together with a sensing mode.

Particularly under the setting rule in the first situation, silence periods are set statically at a silence periodicity P1, and also under the setting rule in the second situation, silence periods are set dynamically at a silence periodicity P2.

P1>>P2, P1 represents the periodicity at which silence periods are configured statically, and P2 represents the periodicity at which silence periods are configured dynamically.

In a particular implementation, for the silence periods which are set statically, spectrum sensing is performed at the corresponding frequency as proposed in the first situation above.

For the silence periods which are set dynamically, spectrum sensing is performed at the corresponding frequency as proposed in the second situation above.

Figure 9:
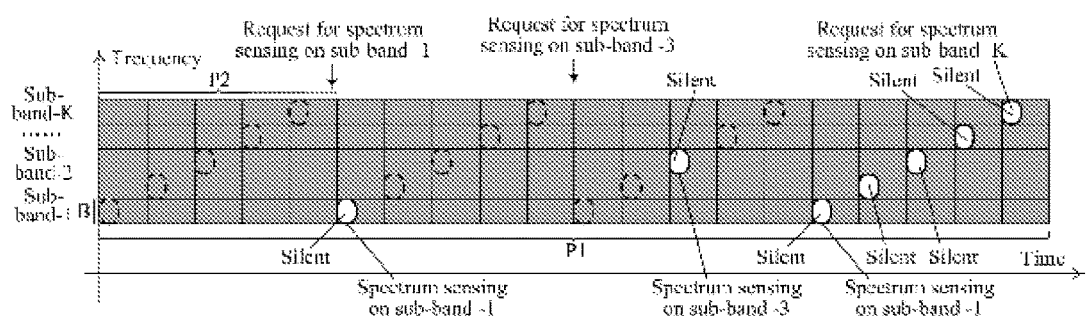
FIG. 9 is a schematic diagram of a hybrid configuration of a time-frequency pattern of silence periods in a particular application scenario according to an embodiment of the invention.

FIG. 9 is a schematic diagram of a hybrid configuration of a time-frequency pattern of silence periods in a particular application scenario according to an embodiment of the invention.

It shall be noted that when the pattern of silence periods is configured in any of the situations above, silence periods can be further configured particularly in the following two implementations:

In a first implementation, silence periods are configured by a specification in which parameters are configured including the periodicity P of silence periods (where the periodicity further includes the periodicity P1 of static silence periods and the periodicity P2 of dynamic silence periods), the bandwidth B of each sub-band, starting locations of the silence periods corresponding to the respective sub-bands and ending locations of the silence periods corresponding to the respective sub-bands.

In a second implementation, the pattern of silence periods is configured by a centralized logical entity transmitting a control message in which parameters are configured including the periodicity P of silence periods (where the periodicity further includes the periodicity P1 of static silence periods and the periodicity P2 of dynamic silence periods), the bandwidth B of each sub-band, starting locations of the silence periods corresponding to the respective sub-bands and ending locations of the silence periods corresponding to the respective sub-bands.

In a real application, either of the implementations above to be applied can be decided as needed in reality without departing from the scope of the invention.

Furthermore the method above can be applicable to both a TDD system and an FDD system:

(1) For a TDD system, the CR cell occupies one or more sub-bands, and silence periods are configured as described in one of the situations above in either of the implementations above.

(2) For an FDD system, it can be considered that the CR cell occupies one or more sub-bands, and silence periods are configured as described in one of the situations above in either of the implementations above.

(3) For an FDD system, it can alternatively be considered that one or more sub-bands are occupied respectively in the uplink and the downlink, and silence is enforced separately in the occupied sub-bands in the uplink and the downlink; and silence periods can be configured particularly as described in one of the situations above in either of the implementations above.

It shall be further noted that for a multi-carrier system, it can be considered that the respective carriers occupy one or more sub-bands respectively and silence is enforced separately over the respective carriers; and a temporal location, at which a specific carrier is silent, can be configured particularly as described in one of the situations above in either of the implementations above.

Still furthermore, the technical solution according to the invention will be described in details in the following particular embodiments.

A first embodiment relates to a static configuration pattern of silence periods and strategy of spectrum sensing.

In this embodiment, there are cognitive radio-enabled Time Division-Long Term Evolution (TD-LTE) systems, and idle TV bands are sensed, in a particular operating scenario.

Due to the 8 MHz bandwidth of each TV band, it is assumed that only a bandwidth of 8 MHz can be sensed through spectrum sensing at a time and that there are four bandwidths of TV channels throughout a bandwidth to be sensed, which are considered respectively as a sub-band −1, a sub-band −2, a sub-band −3 and a sub-band −4.

Furthermore it is assumed that there are a target TD-LTE system with a bandwidth of 10 MHz operating at the sub-band −1 and the sub-band −2 and an adjacent TD-LTE system with a bandwidth of 10 MHz currently operating at the sub-band −3 and the sub-band −4.

In such an application scenario, a static configuration pattern of silence periods of the TD-LTE network is preset so that the periodicity of static silence periods is P and the pattern is configured particularly as follows:

The TD-LTE system operating in the sub-band −1 is silent in the i-th sub-frame (or the i-th, (i+1)-th, (i+2)-th . . . sub-frames) of a system frame with Mod (SFN, P)=s1.

The TD-LTE system operating in the sub-band −2 is silent in the i-th sub-frame (or the i-th, (i+1)-th, (i+2)-th . . . sub-frames) of a system frame with Mod (SFN, P)=s2.

The TD-LTE system operating in the sub-band −3 is silent in the i-th sub-frame (or the i-th, (i+1)-th, (i+2)-th . . . sub-frames) of a system frame with Mod (SFN, P)=s3.

The TD-LTE system operating in the sub-band −4 is silent in the i-th sub-frame (or the i-th, (i+1)-th, (i+2)-th . . . sub-frames) of a system frame with Mod (SFN, P)=s4.

The length of a system frame with the SFN (System Frame Number) in the TD-LTE system can particularly be 10 ms.

Following the setting above, the target TD-LTE system has the sub-frames of the present system silent periodically, and the silent sub-frames include the i-th sub-frame (or the i-th, (i+1)-th, (i+2)-th . . . sub-frames) of the system frame with Mod (SFN, P)=s1 and the i-th sub-frame (or the i-th, (i+1)-th, (i+2)-th sub-frames) of the system frame with Mod (SFN, P)=s2.

Alike the adjacent TD-LTE system also has the sub-frames of the present system silent periodically, and the silent sub-frames include the i-th sub-frame (or the i-th, (i+1)-th, (i+2)-th sub-frames) of the system frame with Mod (SFN, P)=s3 and the i-th sub-frame (or the i-th, (i+1)-th, (i+2)-th . . . sub-frames) of the system frame with Mod (SFN, P)=s4.

In this situation, the target TD-LTE system performs spectrum sensing of the respective channels respectively in the following sub-frames:

Sensing on the sub-band −1 is performed in the i-th sub-frame (or the i-th, (i+1)-th, (i+2)-th sub-frames) of the system frame with Mod (SFN, P)=s1.

Sensing on the sub-band −2 is performed in the i-th sub-frame (or the i-th, (i+1)-th, (i+2)-th sub-frames) of the system frame with Mod (SFN, P)=s2.

Sensing on the sub-band −3 is performed in the i-th sub-frame (or the i-th, (i+1)-th, (i+2)-th sub-frames) of the system frame with Mod (SFN, P)=s3.

Sensing on the sub-band −4 is performed in the i-th sub-frame (or the i-th, (i+1)-th, (i+2)-th sub-frames) of the system frame with Mod (SFN, P)=s4.

In this embodiment, a particular example of the parameters is P=500, s1=0, s2=1, s3=2, s4=3 and i=2.

A second embodiment relates to a dynamic configuration pattern of silence periods and strategy of spectrum sensing.

In this embodiment, a particular operating scenario is the same as the operating scenario in the first embodiment, so a repeated description thereof will be omitted here.

In such an application scenario, a dynamic configuration pattern of silence periods of the TD-LTE network is preset so that the periodicity of dynamic silence periods is P and the pattern is configured particularly as follows:

The TD-LTE system operating in the sub-band –1 is to be silent in the i-th sub-frame (or the i-th, (i+1)-th, (i+2)-th . . . sub-frames) of a system frame with Mod (SFN, P)=s1.

The TD-LTE system operating in the sub-band –2 is to be silent in the i-th sub-frame (or the i-th, (i+1)-th, (i+2)-th . . . sub-frames) of a system frame with Mod (SFN, P)=s2.

The TD-LTE system operating in the sub-band –3 is to be silent in the i-th sub-frame (or the i-th, (i+1)-th, (i+2)-th . . . sub-frames) of a system frame with Mod (SFN, P)=s3.

The TD-LTE system operating in the sub-band –4 is to be silent in the i-th sub-frame (or the i-th, (i+1)-th, (i+2)-th . . . sub-frames) of a system frame with Mod (SFN, P)=s4.

Following the setting above, if the target TD-LTE system needs to perform spectrum sensing of channels in the sub-band –2 in response to a dynamic request, then the target TD-LTE system triggers the present system and the adjacent TD-LTE system so that the target TD-LTE system and the adjacent TD-LTE system are to be silent in the i-th sub-frame (or the i-th, (i+1)-th, (i+2)-th . . . sub-frames) of the next system frame with Mod (SFN, P)=s2.

Then the target TD-LTE system performs spectrum sensing on the sub-band –2 in the silence periods above.

In this embodiment, a particular example of the parameters is P=8, s1=0, s2=1, s3=2, s4=3 and i=4.

A second embodiment relates to a hybrid configuration pattern of silence periods and strategy of spectrum sensing.

In this embodiment, a particular operating scenario is the same as the operating scenario in the first embodiment, so a repeated description thereof will be omitted here.

In such an application scenario, a dynamic configuration pattern of silence periods of the TD-LTE network is preset so that the periodicity of dynamic silence periods is P1 and the pattern is configured particularly as follows:

The TD-LTE system operating in the sub-band –1 is to be silent in the i-th sub-frame (or the i-th, (i+1)-th, (i+2)-th . . . sub-frames) of a system frame with Mod (SFN, P1)=s1.

The TD-LTE system operating in the sub-band –2 is to be silent in the i-th sub-frame (or the i-th, (i+1)-th, (i+2)-th . . . sub-frames) of a system frame with Mod (SFN, P1)=s2.

The TD-LTE system operating in the sub-band –3 is to be silent in the i-th sub-frame (or the i-th, (i+1)-th, (i+2)-th . . . sub-frames) of a system frame with Mod (SFN, P1)=s3.

The TD-LTE system operating in the sub-band –4 is to be silent in the i-th sub-frame (or the i-th, (i+1)-th, (i+2)-th . . . sub-frames) of a system frame with Mod (SFN, P1)=s4.

On the other hand, a static configuration pattern of silence periods of the TD-LTE network is preset so that the periodicity of static silence periods is P2 and the pattern is configured particularly as follows:

The TD-LTE system operating in the sub-band –1 is silent in the m-th sub-frame (or the m-th, (m+1)-th, (m+2)-th . . . sub-frames) of a system frame with Mod (SFN, P2)=s1.

The TD-LTE system operating in the sub-band –2 is silent in the m-th sub-frame (or the m-th, (m+1)-th, (m+2)-th . . . sub-frames) of a system frame with Mod (SFN, P2)=s2.

The TD-LTE system operating in the sub-band –3 is silent in the m-th sub-frame (or the m-th, (m+1)-th, (m+2)-th . . . sub-frames) of a system frame with Mod (SFN, P2)=s3.

The TD-LTE system operating in the sub-band –4 is silent in the m-th sub-frame (or the m-th, (m+1)-th, (m+2)-th . . . sub-frames) of a system frame with Mod (SFN, P2)=s4.

Following the setting above, the target TD-LTE system has the sub-frames of the present system silent periodically, and the silent sub-frames include the m-th sub-frame (or the m-th, (m+1)-th, (m+2)-th sub-frames) of the system frame with Mod (SFN, P1)=s1 and the m-th sub-frame (or the m-th, (m+1)-th, (m+2)-th . . . sub-frames) of the system frame with Mod (SFN, P1)=s2.

Alike the adjacent TD-LTE system has the sub-frames of the present system silent periodically, and the silent sub-frames include the m-th sub-frame (or the m-th, (m+1)-th, (m+2)-th . . . sub-frames) of the system frame with Mod (SFN, P2)=s1 and the m-th sub-frame (or the m-th, (m+1)-th, (m+2)-th . . . sub-frames) of the system frame with Mod (SFN, P2)=s2.

In this situation, the target TD-LTE system performs spectrum sensing of the respective channels respectively in the following sub-frames:

Sensing on the sub-band –1 is performed in the m-th sub-frame (or the m-th, (m+1)-th, (m+2)-th . . . sub-frames) of the system frame with Mod (SFN, P2)=s1.

Sensing on the sub-band –2 is performed in the m-th sub-frame (or the m-th, (m+1)-th, (m+2)-th . . . sub-frames) of the system frame with Mod (SFN, P2)=s2.

Sensing on the sub-band –3 is performed in the m-th sub-frame (or the m-th, (m+1)-th, (m+2)-th . . . sub-frames) of the system frame with Mod (SFN, P2)=s3.

Sensing on the sub-band –4 is performed in the m-th sub-frame (or the m-th, (m+1)-th, (m+2)-th . . . sub-frames) of the system frame with Mod (SFN, P2)=s4.

Furthermore if the target TD-LTE system needs to perform spectrum sensing on the sub-band –2 in response to a dynamic request, then the target TD-LTE system triggers the present system and the adjacent TD-LTE system so that the target TD-LTE system and the adjacent TD-LTE system are silent in the i-th sub-frame (or the i-th, (i+1)-th, (i+2)-th sub-frames) of the next system frame with Mod (SFN, P1)=s2.

Correspondingly the target TD-LTE system performs spectrum sensing on the sub-band –2 in the silence periods above.

In this embodiment, a particular example of the parameters is P1=8, P2=500, s1=0, s2=1, s3=2, s4=3, i=4, and m=2.

A fourth embodiment relates to a first configuration scheme of a pattern of silence periods.

As specified directly in a specification, a cellular cell operating at a frequency A will not schedule a user equipment periodically in some timeslot or timeslots for the purpose of being silent.

A fifth embodiment relates to a second configuration scheme of a pattern of silence periods.

A centralized logical entity configures a cellular cell with a pattern of silence periods in a radio or wired control message in which parameters are configured including the periodicity P of silence periods (including the periodicity P1 of static silence periods and the periodicity P2 of dynamic silence periods), the bandwidth B of each sub-band, starting locations of the silence periods corresponding to the respective sub-bands and ending locations of the silence periods corresponding to the respective sub-bands.

A sixth embodiment relates to a silence scheme of an FDD system.

A band available to the FDD system is divided into sub-bands with a bandwidth of x MHz so that a sub-band A is occupied in the uplink and a sub-band B is occupied in the downlink of the FDD system.

If the periodicity of silence periods is P, then the pattern of silence periods is as follows:

The system operating in the sub-band A is silent in the m-th sub-frame (or the m-th, (m+1)-th, (m+2)-th . . . sub-frames) of a system frame with Mod (SFN, P)=a1.

The system operating in the sub-band B is silent in the m-th sub-frame (or the m-th, (m+1)-th, (m+2)-th . . . sub-frames) of a system frame with Mod (SFN, P)=b1.

Based upon the setting above, silent period temporal locations of the FDD system are as follows:

Silence is enforced in the uplink in the m-th sub-frame (or the m-th, (m+1)-th, (m+2)-th . . . sub-frames) of the system frame with Mod (SFN, P)=a1.

Silence is enforced in the downlink in the m-th sub-frame (or the m-th, (m+1)-th, (m+2)-th . . . sub-frames) of the system frame with Mod (SFN, P)=b1.

A seventh embodiment relates to a multi-carrier pattern of silence periods.

A band available to a multi-carrier system is divided into sub-bands with a bandwidth of x MHz so that a carrier −1 of the multi-carrier system operates in a sub-band A and a carrier −2 thereof operates in a sub-band B.

Firstly, if the periodicity of silence periods is P, then the pattern of silence periods is as follows:

The system operating in the sub-band A is silent in the m-th sub-frame (or the m-th, (m+1)-th, (m+2)-th . . . sub-frames) of a system frame with Mod (SFN, P)=a1.

The system operating in the sub-band B is silent in the m-th sub-frame (or the m-th, (m+1)-th, (m+2)-th . . . sub-frames) of a system frame with Mod (SFN, P)=b1.

Based upon the setting above, silent period temporal locations of the multi-carrier system are as follows:

The carrier −1 is silent in the m-th sub-frame (or the m-th, (m+1)-th, (m+2)-th sub-frames) of the system frame with Mod (SFN, P)=a1.

The carrier −2 is silent in the m-th sub-frame (or the m-th, (m+1)-th, (m+2)-th sub-frames) of the system frame with Mod (SFN, P)=b1.

The technical solution according to the embodiments of the invention has the following advantages over the prior art:

With an application of the technical solution according to the embodiments of the invention, cognitive radio cells obtain the division of frequency band resources into sub-bands and a corresponding time-frequency pattern of silence periods, and the cognitive radio cells are silent in sub-bands, where the cognitive radio cells operates, according to silence period temporal locations of the respective sub-bands defined in the time-frequency pattern of silence periods, so that the cognitive radio spectrum sensing system or the respective cognitive radio cells perform spectrum sensing on the corresponding sub-bands, and thus in an environment where a plurality of cognitive radio cells are deployed in a network, the uniform time-frequency pattern of silence periods and strategy of spectrum sensing are applicable to the plurality of cognitive cells in this method so that spectrum sensing can be avoided effectively from interference of the present cognitive cell and another adjacent cognitive cell or cells in the event that there are a plurality of cognitive cells; and the frequency band resources are divided into the sub-bands, and both silence is enforced and spectrum sensing is performed respectively in the sub-bands, so that the number of silence periods required for spectrum sensing can be lowered effectively to thereby improve the throughput of the cognitive radio spectrum sensing system.

Figure 10:
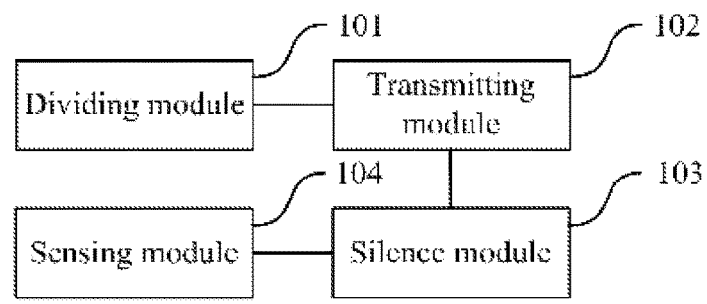
FIG. 10 is a schematic structural diagram of a network device according to an embodiment of the invention.

In order to implement the technical solution according to the embodiments of the invention, an embodiment of the invention further provides a network device applicable to a radio cognitive system, and FIG. 10 illustrates a schematic structural diagram thereof which includes at least the following modules:

A dividing module 101 configured to divide frequency band resources into a plurality of sub-bands;

A transmitting module 102 configured to notify respective cognitive radio cells of the division into the sub-bands, and a corresponding time-frequency pattern of silence periods, determined by the dividing module 101;

A silence module 103 configured to have the respective cognitive radio cells silent in sub-bands, where the cognitive radio cells operate, according to silence period temporal locations of the respective sub-bands defined in the time-frequency pattern of silence periods; and A sensing module 104 configured to perform spectrum sensing on the respective sub-bands when the silence module 103 enforces silence.

In a particular application scenario, the dividing module 101 is configured:

To divide the frequency band resources into the plurality of sub-bands according to preset parameters related to the time-frequency pattern of silence periods and to notify the respective cognitive radio cells of the division into the sub-bands and the corresponding time-frequency pattern of silence periods; or To obtain the parameters related to the time-frequency pattern of silence periods by receiving a control message transmitted by a centralized logical entity, to divide the frequency band resources into the plurality of sub-bands according to the parameters related to the time-frequency pattern of silence periods and to notify the respective cognitive radio cells of the division into the sub-bands and the corresponding time-frequency pattern of silence periods;

The parameters related to the time-frequency pattern of silence periods include at least the periodicity of silence periods, the widths of the sub-bands, starting locations of the silence periods corresponding to the respective sub-bands, and ending locations of the silence periods corresponding to the respective sub-bands.

In another particular application scenario, the silence module 103 is configured:

When the time-frequency pattern of silence periods is a statically configured time-frequency pattern of silence periods and it is determined from the time-frequency pattern of silence periods that the current instance of time is a silence period temporal location corresponding to a sub-band or sub-bands where one or more cognitive radio cells operate, to have the cognitive radio cell or cells silent in an interval of time corresponding to the silence period temporal location in the sub-band or sub-bands where the cognitive radio cell or cells operate.

In another particular application scenario,

The transmitting module 102 is further configured to transmit to a cognitive radio cell a request for spectrum sensing on a sub-band where the cognitive radio cell operates; and The silence module 103 is further configured, when the time-frequency pattern of silence periods is a dynamically configured time-frequency pattern of silence periods and the transmitting module 102 transmits to the cognitive radio cell the request for spectrum sensing on the sub-band where the cognitive radio cell operates, to determine from the time-frequency pattern of silence periods one or more silence period temporal locations corresponding to the sub-band after the current instance of time; and to have the cognitive radio cell silent in an interval or intervals of time corresponding to the one or more silence period temporal locations in the sub-band where the cognitive radio cell operates;

When the silence module 103 determines from the time-frequency pattern of silence periods that the current instance of time is a silence period temporal location corresponding to a sub-band where a cognitive radio cell operates, if the transmitting module 102 has not previously transmitted a request for spectrum sensing on the sub-band to the cognitive radio cell, then the silence module 103 gives up having the cognitive radio cell silent in an interval of time corresponding to the silence period temporal location in the sub-band where the cognitive radio cell operates but has the cognitive radio cell continue with normal operation in the sub-band.

In another particular application scenario,

The transmitting module 102 is further configured to transmit to a cognitive radio cell a request for spectrum sensing on a sub-band where the cognitive radio cell operates; and The silence module 103 is further configured, when the time-frequency pattern of silence periods is a time-frequency pattern of silence periods configured in hybrid, to identify a dynamic sensing periodicity configured in the hybrid configuration scheme, and when it is determined from the time-frequency pattern of silence periods that the current instance of time is a silence period temporal location outside of the dynamic sensing periodicity corresponding to a sub-band where a cognitive radio cell operates, to have the cognitive radio cell silent in an interval of time corresponding to the silence period temporal location in the sub-band where the cognitive radio cell operates;

When the transmitting module 102 transmits to a cognitive radio cell a request for spectrum sensing on a sub-band where the cognitive radio cell operates, to determine from the time-frequency pattern of silence periods one or more silence period temporal locations in the dynamic sensing periodicity corresponding to the sub-band after the current instance of time, and to have the cognitive radio cell silent in an interval or intervals of time corresponding to the one or more silence period temporal locations in the sub-band where the cognitive radio cell operates; and When it is determined from the time-frequency pattern of silence periods that the current instance of time is a silence period temporal location in the dynamic sensing periodicity corresponding to a sub-band or sub-bands where one or more cognitive radio cells operate, and the transmitting module 102 has not previously transmitted a request for spectrum sensing on the sub-band or sub-bands to the cognitive radio cell or cells, to give up having the cognitive radio cell or cells silent in an interval of time corresponding to the silence period temporal location in the sub-band or sub-bands where the cognitive radio cell or cells operate but have the cognitive radio cell or cells continue with normal operation in the sub-band or sub-bands.

Those skilled in the art can clearly appreciate from the foregoing description of the embodiments that the embodiments of the invention can be implemented in hardware or in software plus a necessary general hardware platform. Based upon such understanding, the technical solution according to the embodiments of the invention can be embodied in the form of a program product which can be stored in a nonvolatile storage medium (e.g., a CD-ROM, a U disk, a mobile hard disk, etc.) and which includes several instructions to cause a computer device (e.g., which can be a personal computer, a server, a network-side device, etc.) to perform the method according to the respective embodiments of the invention in the respective implementation scenarios.

Figure 11:
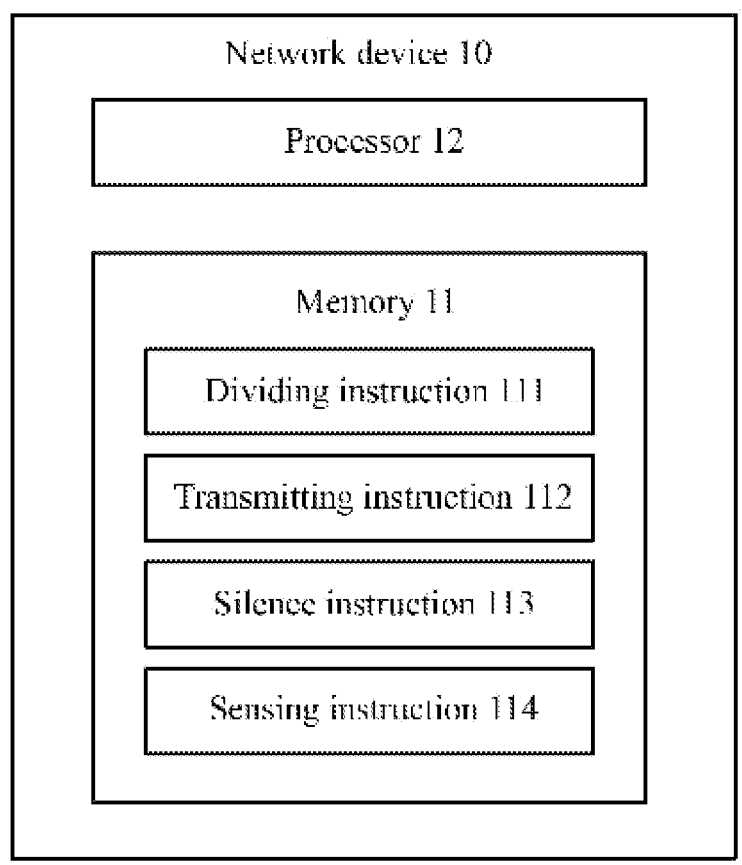
FIG. 11 is a schematic structural diagram of a network device according to an embodiment of the invention.

For example, an embodiment of the invention further provides a network device 10 applicable to a radio cognitive system, and FIG. 11 illustrates a schematic structural diagram thereof which includes at least a memory 11 and a processor 12 communicating with the memory 11, where the memory 11 stores therein a dividing instruction 111, a transmitting instruction 112, a silence instruction 113, and a sensing instruction 114, executable by the processor 12.

The dividing instruction 111 is configured to instruct to divide frequency band resources into a plurality of sub-bands;

The transmitting instruction 112 is configured to instruct to notify respective cognitive radio cells of the division into the sub-bands, and a corresponding time-frequency pattern of silence periods, determined in response to the dividing instruction 111;

The silence instruction 113 is configured to instruct to have the respective cognitive radio cells silent in sub-bands, where the cognitive radio cells operate, according to silence period temporal locations of the respective sub-bands defined in the time-frequency pattern of silence periods; and The sensing instruction 114 is configured to instruct to perform spectrum sensing on the respective sub-bands when silence is enforced in response to the silence instruction 113.

In a particular application scenario, the dividing instruction 111 is configured to instruct:

To divide the frequency band resources into the plurality of sub-bands according to preset parameters related to the time-frequency pattern of silence periods and to notify the respective cognitive radio cells of the division into the sub-bands and the corresponding time-frequency pattern of silence periods; or To obtain the parameters related to the time-frequency pattern of silence periods by receiving a control message transmitted by a centralized logical entity, to divide the frequency band resources into the plurality of sub-bands according to the parameters related to the time-frequency pattern of silence periods and to notify the respective cognitive radio cells of the division into the sub-bands and the corresponding time-frequency pattern of silence periods;

The parameters related to the time-frequency pattern of silence periods include at least the periodicity of silence periods, the widths of the sub-bands, starting locations of the silence periods corresponding to the respective sub-bands, and ending locations of the silence periods corresponding to the respective sub-bands.

In another particular application scenario, the silence instruction 113 is configured to instruct:

When the time-frequency pattern of silence periods is a statically configured time-frequency pattern of silence periods and it is determined from the time-frequency pattern of silence periods that the current instance of time is a silence period temporal location corresponding to a sub-band or sub-bands where one or more cognitive radio cells operate, to have the cognitive radio cell or cells silent in an interval of time corresponding to the silence period temporal location in the sub-band or sub-bands where the cognitive radio cell or cells operate.

In another particular application scenario,

The transmitting instruction 112 is further configured to instruct to transmit to a cognitive radio cell a request for spectrum sensing on a sub-band where the cognitive radio cell operates; and The silence instruction 113 is further configured, when the time-frequency pattern of silence periods is a dynamically configured time-frequency pattern of silence periods and a request for spectrum sensing on a sub-band, where a cognitive radio cell operates, has been transmitted to the cognitive radio cell in response to the transmitting instruction 112, to instruct to determine from the time-frequency pattern of silence periods one or more silence period temporal locations corresponding to the sub-band after the current instance of time; and to instruct to have the cognitive radio cell silent in an interval or intervals of time corresponding to the one or more silence period temporal locations in the sub-band where the cognitive radio cell operates;

When the silence instruction 113 determines from the time-frequency pattern of silence periods that the current instance of time is a silence period temporal location corresponding to a sub-band where a cognitive radio cell operates, if a request for spectrum sensing on the sub-band has not been previously transmitted to the cognitive radio cell in response to the transmitting instruction 112, then the silence instruction 113 instructs to give up having the cognitive radio cell silent in an interval of time corresponding to the silence period temporal location in the sub-band where the cognitive radio cell operates but have the cognitive radio cell continue with normal operation in the sub-band.

In another particular application scenario,

The transmitting instruction 112 is further configured to instruct to transmit to a cognitive radio cell a request for spectrum sensing on a sub-band where the cognitive radio cell operates; and The silence instruction 113 is further configured, when the time-frequency pattern of silence periods is a time-frequency pattern of silence periods configured in hybrid, to instruct to identify a dynamic sensing periodicity configured in the hybrid configuration scheme, and when it is instructed to determine from the time-frequency pattern of silence periods that the current instance of time is a silence period temporal location outside of the dynamic sensing periodicity corresponding to a sub-band where a cognitive radio cell operates, to instruct to have the cognitive radio cell silent in an interval of time corresponding to the silence period temporal location in the sub-band where the cognitive radio cell operates;

When a request for spectrum sensing on a sub-band, where a cognitive radio cell operates, is transmitted to the cognitive radio cell in response to the transmitting instruction 112, to instruct to determine from the time-frequency pattern of silence periods one or more silence period temporal locations in the dynamic sensing periodicity corresponding to the sub-band after the current instance of time, and to instruct to have the cognitive radio cell silent in an interval or intervals of time corresponding to the one or more silence period temporal locations in the sub-band where the cognitive radio cell operates; and When it is determined from the time-frequency pattern of silence periods that the current instance of time is a silence period temporal location in the dynamic sensing periodicity corresponding to a sub-band or sub-bands where one or more cognitive radio cells operate, and a request for spectrum sensing on the sub-band or sub-bands has not been previously transmitted to the cognitive radio cell or cells in response to the transmitting instruction 112, to instruct to give up having the cognitive radio cell or cells silent in an interval of time corresponding to the silence period temporal location in the sub-band or sub-bands where the cognitive radio cell or cells operate but have the cognitive radio cell or cells continue with normal operation in the sub-band or sub-bands.

Figure 12:
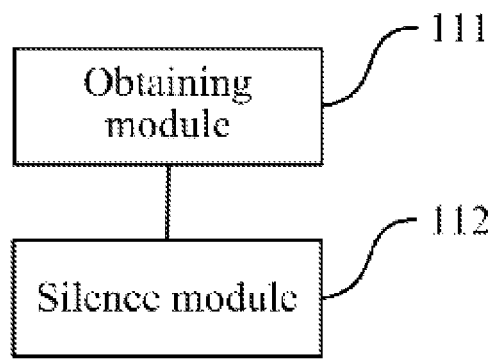
FIG. 12 is a schematic structural diagram of a network device according to an embodiment of the invention.

Furthermore an embodiment of the invention further provides a network device applicable to a radio cognitive system, and FIG. 12 illustrates a schematic structural diagram thereof which includes at least the following modules:

An obtaining module 121 is to configured to obtain division into sub-bands and a corresponding time-frequency pattern of silence periods; and A silence module 122 is configured to enforce silence in a sub-band, where a cognitive radio cell operates, according to silence period temporal locations of the respective sub-bands defined in the corresponding time-frequency pattern of silence periods to perform spectrum sensing on the corresponding sub-band.

The obtaining module 121 is configured:

To obtain the division into the sub-bands and the corresponding time-frequency pattern of silence periods from received information notified of by a cognitive radio spectrum sensing system, where the cognitive radio spectrum sensing system divides frequency band resources into the plurality of sub-bands; or To determine the division into the sub-bands and the corresponding time-frequency pattern of silence periods directly under a preset rule.

In a particular application scenario, the silence module 122 is configured:

When the time-frequency pattern of silence periods is a statically configured time-frequency pattern of silence periods and it is determined from the time-frequency pattern of silence periods that the current instance of time is a silence period temporal location corresponding to a sub-band where the cognitive radio cell operates, to have the cognitive radio cell silent in an interval of time corresponding to the silence period temporal location in the sub-band where the cognitive radio cell operates.

In another particular application scenario,

The obtaining module 121 is further configured to receive a request transmitted by the cognitive radio spectrum sensing system for spectrum sensing on a sub-band where the cognitive radio cell operates; and The silence module 122 is further configured, when the time-frequency pattern of silence periods is a dynamically configured time-frequency pattern of silence periods and the obtaining module 121 receives a request for spectrum sensing on a sub-band where the cognitive radio cell operates, to determine from the time-frequency pattern of silence periods one or more silence period temporal locations corresponding to the sub-band after the current instance of time; and to have the cognitive radio cell silent in an interval or intervals of time corresponding to the one or more silence period temporal locations in the sub-band where the cognitive radio cell operates;

When the silence module 122 determines from the time-frequency pattern of silence periods that the current instance of time is a silence period temporal location corresponding to a sub-band where the cognitive radio cell operates, if the obtaining module 121 has not previously obtained a request for spectrum sensing on the sub-band, then the silence module 122 gives up having the cognitive radio cell silent in the sub-band where the cognitive radio cell operates but has the cognitive radio cell continue with normal operation in the sub-band.

In another particular application scenario, the network device further includes a transmitting module 123, and The transmitting module 123 is configured to transmit to a cognitive radio cell a request for spectrum sensing on a sub-band where the cognitive radio cell operates; and The silence module 122 is configured, when the time-frequency pattern of silence periods is a time-frequency pattern of silence periods configured in hybrid, to identify a dynamic sensing periodicity configured in the hybrid configuration scheme, and when it is determined from the time-frequency pattern of silence periods that the current instance of time is a silence period temporal location outside of the dynamic sensing periodicity corresponding to a sub-band where a cognitive radio cell operates, to have the cognitive radio cell silent in an interval of time corresponding to the silence period temporal location in the sub-band where the cognitive radio cell operates;

When the obtaining module 121 receives a request for spectrum sensing on a sub-band where the cognitive radio cell operates, to determine from the time-frequency pattern of silence periods one or more silence period temporal locations in the dynamic sensing periodicity corresponding to the sub-band after the current instance of time, and to have the cognitive radio cell silent in an interval or intervals of time corresponding to the one or more silence period temporal locations in the sub-band where the cognitive radio cell operates; and When it is determined from the time-frequency pattern of silence periods that the current instance of time is a silence period temporal location in the dynamic sensing periodicity corresponding to a sub-band where the cognitive radio cell operates, and the obtaining module 121 has not previously received a request for spectrum sensing on the sub-band, the silence module 122 gives up having the cognitive radio cell silent in the sub-band where the cognitive radio cell operates but has the cognitive radio cell or cells continue with normal operation in the sub-band or sub-bands.

Figure 13:
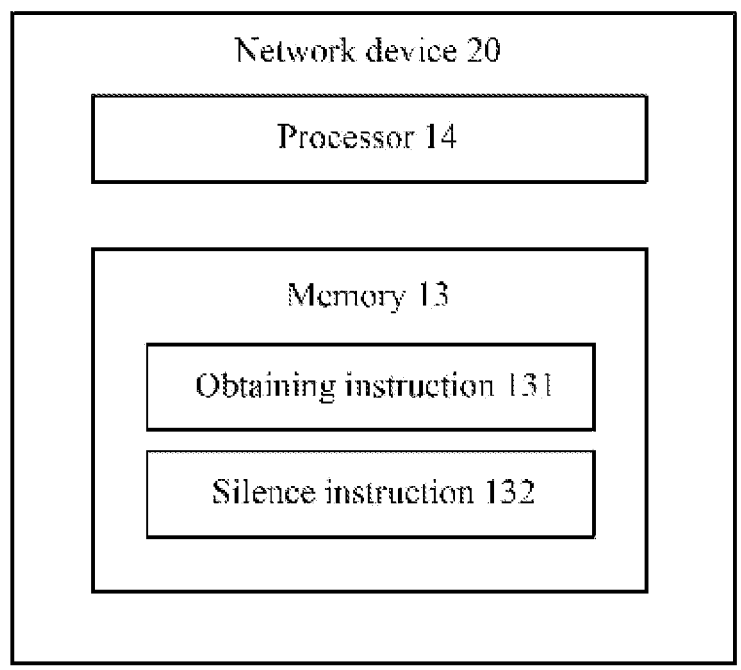
FIG. 13 is a schematic structural diagram of another network device according to an embodiment of the invention.

Furthermore an embodiment of the invention further provides a network device 20 applicable to a radio cognitive system, and FIG. 13 illustrates a schematic structural diagram thereof which includes at least a memory 13 and a processor 14 communicating with the memory 13, where the memory 13 stores therein a obtaining instruction 131, and a silence instruction 132, executable by the processor 14.

The obtaining instruction 131 is to configured to instruct to obtain division into sub-bands and a corresponding time-frequency pattern of silence periods; and The silence instruction 132 is configured to instruct to enforce silence in a sub-band, where a cognitive radio cell operates, according to silence period temporal locations of the respective sub-bands defined in the corresponding time-frequency pattern of silence periods to perform spectrum sensing on the corresponding sub-band.

The obtaining instruction 131 is configured to instruct:

To obtain the division into the sub-bands and the corresponding time-frequency pattern of silence periods from received information notified of by a cognitive radio spectrum sensing system, where the cognitive radio spectrum sensing system divides frequency band resources into the plurality of sub-bands; or To determine the division into the sub-bands and the corresponding time-frequency pattern of silence periods directly under a preset rule.

In a particular application scenario, the silence instruction 132 is configured to instruct:

When the time-frequency pattern of silence periods is a statically configured time-frequency pattern of silence periods and it is determined from the time-frequency pattern of silence periods that the current instance of time is a silence period temporal location corresponding to a sub-band where the cognitive radio cell operates, to have the cognitive radio cell silent in an interval of time corresponding to the silence period temporal location in the sub-band where the cognitive radio cell operates.

In another particular application scenario,

The obtaining instruction 131 is further configured to instruct to receive a request transmitted by the cognitive radio spectrum sensing system for spectrum sensing on a sub-band where the cognitive radio cell operates; and The silence instruction 132 is further configured, when the time-frequency pattern of silence periods is a dynamically configured time-frequency pattern of silence periods and a request for spectrum sensing on a sub-band where the cognitive radio cell operates is received in response to the obtaining instruction 131, to determine from the time-frequency pattern of silence periods one or more silence period temporal locations corresponding to the sub-band after the current instance of time; and to instruct to have the cognitive radio cell silent in an interval or intervals of time corresponding to the one or more silence period temporal locations in the sub-band where the cognitive radio cell operates;

When the silence instruction 132 determines from the time-frequency pattern of silence periods that the current instance of time is a silence period temporal location corresponding to a sub-band where the cognitive radio cell operates, if a request for spectrum sensing on the sub-band has not been previously obtained in response to the obtaining instruction 131, then the silence instruction 132 instructs to give up having the cognitive radio cell silent in the sub-band where the cognitive radio cell operates but have the cognitive radio cell continue with normal operation in the sub-band.

The obtaining instruction 131 is further configured to instruct to receive a request for spectrum sensing on a sub-band where the cognitive radio cell operates; and The silence instruction 132 is further configured, when the time-frequency pattern of silence periods is a time-frequency pattern of silence periods configured in hybrid, to instruct to identify a dynamic sensing periodicity configured in the hybrid configuration scheme, and when it is instructed that it is determined from the time-frequency pattern of silence periods that the current instance of time is a silence period temporal location outside of the dynamic sensing periodicity corresponding to a sub-band where a cognitive radio cell operates, to have the cognitive radio cell silent in an interval of time corresponding to the silence period temporal location in the sub-band where the cognitive radio cell operates;

When a request for spectrum sensing on a sub-band where the cognitive radio cell operates is received in response to the obtaining instruction 131, to instruct to determine from the time-frequency pattern of silence periods one or more silence period temporal locations in the dynamic sensing periodicity corresponding to the sub-band after the current instance of time, and to have the cognitive radio cell silent in an interval or intervals of time corresponding to the one or more silence period temporal locations in the sub-band where the cognitive radio cell operates; and When it is instructed to determine from the time-frequency pattern of silence periods that the current instance of time is a silence period temporal location in the dynamic sensing periodicity corresponding to a sub-band where the cognitive radio cell operates, and a request for spectrum sensing on the sub-band has not been previously received in response to the obtaining instruction 131, the silence instruction 132 instructs to give up having the cognitive radio cell silent in the sub-band where the cognitive radio cell operates but have the cognitive radio cell or cells continue with normal operation in the sub-band or sub-bands.

The technical solution according to the embodiments of the invention has the following advantages over the prior art:

With an application of the technical solution according to the embodiments of the invention, cognitive radio cells obtain the division of frequency band resources into sub-bands and a corresponding time-frequency pattern of silence periods, and the cognitive radio cells are silent in sub-bands, where the cognitive radio cells operates, according to silence period temporal locations of the respective sub-bands defined in the time-frequency pattern of silence periods, so that the cognitive radio spectrum sensing system or the respective cognitive radio cells perform spectrum sensing on the corresponding sub-bands, and thus in an environment where a plurality of cognitive radio cells are deployed in a network, the uniform time-frequency pattern of silence periods and strategy of spectrum sensing are applicable to the plurality of cognitive cells in this method so that spectrum sensing can be avoided effectively from interference of the present cognitive cell and another adjacent cognitive cell or cells in the event that there are a plurality of cognitive cells; and the frequency band resources are divided into the sub-bands, and both silence is enforced and spectrum sensing is performed respectively in the sub-bands, so that the number of silence periods required for spectrum sensing can be lowered effectively to thereby improve the throughput of the cognitive radio system.

Those skilled in the art can appreciate that the drawings are merely a schematic diagram of preferred embodiments and the module(s) or the flow(s) in the drawings may not necessarily be required to implement the embodiments of the invention.

Those skilled in the art can appreciate that the modules in the devices in the implementation scenarios can be distributed in the devices in the implementation scenarios as described in the implementation scenarios or located in one or more devices different from those of the implementation scenarios given corresponding variations. The modules in the implementation scenarios above can be combined into one module or further subdivided into a plurality of sub-modules.

The embodiments of the invention have been numbered only for the sake of a convenient description but will not suggest any superiority of one embodiment to another.

The invention claimed is:

1. A method for spectrum sensing in a cognitive radio system, wherein the method comprises the operations of:
    dividing, by a cognitive radio spectrum sensing system, frequency band resources into a plurality of sub-bands and notifying respective cognitive radio cells of the division into the sub-bands and a corresponding time-frequency pattern of silence periods; and
    when the cognitive radio spectrum sensing system has the respective cognitive radio cells silent in sub-bands, where the cognitive radio cells operate, according to silence period temporal locations of respective sub-bands defined in the time-frequency pattern of silence periods, performing, by the cognitive radio spectrum sensing system, spectrum sensing on the respective sub-bands;
    wherein the time-frequency pattern of silence periods comprises: a statically configured time-frequency pattern of silence periods; or a dynamically configured time-frequency pattern of silence periods; or a time-frequency pattern of silence periods configured in hybrid;
    wherein the time-frequency pattern of silence periods defines silence period temporal locations of the respective sub-bands in at least one sensing periodicity; and the silence period temporal locations of the respective sub-bands do not overlap with each other;
    wherein when the time-frequency pattern of silence periods is a statically configured time-frequency pattern of silence periods, the cognitive radio spectrum sensing system having the respective cognitive radio cells silent in the sub-bands, where the cognitive radio cells operate, according to the silence period temporal locations of the respective sub-bands defined in the time-frequency pattern of silence periods comprises:
    when the cognitive radio spectrum sensing system determines from the time-frequency pattern of silence periods that a current instance of time is a silence period temporal location corresponding to a sub-band or sub-bands where one or more cognitive radio cells operate, the cognitive radio spectrum sensing system having the cognitive radio cell or cells silent in an interval of time corresponding to the silence period temporal location in the sub-band or sub-bands where the cognitive radio cell or cells operate;
    or when the time-frequency pattern of silence periods is a dynamically configured time-frequency pattern of silence periods, the cognitive radio spectrum sensing system having the respective cognitive radio cells silent in the sub-bands, where the cognitive radio cells operate, according to the silence period temporal locations of the respective sub-bands defined in the time-frequency pattern of silence periods comprises:
    when the cognitive radio spectrum sensing system transmits to a cognitive radio cell a request for spectrum sensing on a sub-band where the cognitive radio cell operates, the cognitive radio spectrum sensing system determining from the time-frequency pattern of silence periods one or more silence period temporal locations corresponding to the sub-band after a current instance of time; and
    the cognitive radio spectrum sensing system having the cognitive radio cell silent in an interval or intervals of time corresponding to the one or more silence period temporal locations in the sub-band where the cognitive radio cell operates; and wherein when the cognitive radio spectrum sensing system determines from the time-frequency pattern of silence periods that the current instance of time is a silence period temporal location corresponding to a sub-band where a cognitive radio cell operates, if the cognitive radio spectrum sensing system has not previously transmitted a request for spectrum sensing on the sub-band to the cognitive radio cell, then the cognitive radio spectrum sensing system gives up having the cognitive radio cell silent in an interval of time corresponding to the silence period temporal location in the sub-band where the cognitive radio cell operates but having the cognitive radio cell continue with normal operation in the sub-band;

or when the time-frequency pattern of silence periods is a time-frequency pattern of silence periods configured in hybrid, the cognitive radio spectrum sensing system having the respective cognitive radio cells silent in the sub-bands, where the cognitive radio cells operate, according to the silence period temporal locations of the respective sub-bands defined in the time-frequency pattern of silence periods comprises:

the cognitive radio spectrum sensing system identifying a dynamic sensing periodicity configured in the hybrid configuration scheme;

when the cognitive radio spectrum sensing system determines from the time-frequency pattern of silence periods that a current instance of time is a silence period temporal location outside of the dynamic sensing periodicity corresponding to a sub-band where a cognitive radio cell operates, the cognitive radio spectrum sensing system having the cognitive radio cell silent in an interval of time corresponding to the silence period temporal location in the sub-band where the cognitive radio cell operates;

when the cognitive radio spectrum sensing system transmits to a cognitive radio cell a request for spectrum sensing on a sub-band where the cognitive radio cell operates, the cognitive radio spectrum sensing system determining from the time-frequency pattern of silence periods one or more silence period temporal locations in the dynamic sensing periodicity corresponding to the sub-band after a current instance of time, and the cognitive radio spectrum sensing system having the cognitive radio cell silent in an interval or intervals of time corresponding to the one or more silence period temporal locations in the sub-band where the cognitive radio cell operates; and when the cognitive radio spectrum sensing system determines from the time-frequency pattern of silence periods that the current instance of time is a silence period temporal location in the dynamic sensing periodicity corresponding to a sub-band or sub-bands where one or more cognitive radio cells operate, if the cognitive radio spectrum sensing system has not previously transmitted a request for spectrum sensing on the sub-band or sub-bands to the cognitive radio cell or cells, then the cognitive radio spectrum sensing system giving up having the cognitive radio cell or cells silent in an interval of time corresponding to the silence period temporal location in the sub-band or sub-bands where the cognitive radio cell or cells operate but having the cognitive radio cell or cells continue with normal operation in the sub-band or sub-bands.

2. The method of claim 1, wherein dividing by the cognitive radio spectrum sensing system the frequency band resources into the plurality of sub-bands and notifying the respective cognitive radio cells of the division into the sub-bands and the corresponding time-frequency pattern of silence periods comprises:

dividing by the cognitive radio spectrum sensing system the frequency band resources into the plurality of sub-bands according to preset parameters related to the time-frequency pattern of silence periods and notifying the respective cognitive radio cells of the division into the sub-bands and the corresponding time-frequency pattern of silence periods; or obtaining by the cognitive radio spectrum sensing system the parameters related to the time-frequency pattern of silence periods by receiving a control message transmitted by a centralized logical entity, dividing the frequency band resources into the plurality of sub-bands according to the parameter related to the time-frequency pattern of silence periods and notifying the respective cognitive radio cells of the division into the sub-bands and the corresponding time-frequency pattern of silence periods; and wherein the parameters related to the time-frequency pattern of silence periods comprise at least a periodicity of silence periods, widths of the sub-bands, starting locations of the silence periods corresponding to the respective sub-bands, and ending locations of the silence periods corresponding to the respective sub-bands;

wherein the cognitive radio spectrum sensing system divides the band resources into the plurality of sub-bands under following rules:

the respective sub-bands as a result of the division do not intersect with each other; and a union of resources corresponding to the respective sub-bands as a result of the division is frequency band resources over which the respective cognitive radio cell may operate; and wherein the widths of the respective sub-bands as a result of the division are the same or different.

3. The method of claim 1, wherein temporal lengths of the silence periods corresponding to the silence period temporal locations of the respective sub-bands are the same or different.

4. The method of claim 1, wherein the cognitive radio spectrum sensing system having the respective cognitive radio cells silent in the sub-bands, where the cognitive radio cells operate, according to the silence period temporal locations of the respective sub-bands defined in the time-frequency pattern of silence periods comprises:

the cognitive radio spectrum sensing system instructing the cognitive radio system to stop a message from being transmitted to the cognitive radio cells through the sub-bands in intervals of time corresponding to the silence period temporal locations of the sub-bands.

5. The method of claim 1, wherein:

when the cognitive radio cell operates in a multi-carrier system, respective carriers occupy one or more sub-bands respectively; or when the cognitive radio cell operates in a TDD system, the cognitive radio cell occupies one or more sub-bands; or when the cognitive radio cell operates in an FDD system, the cognitive radio cell occupies one or more sub-bands; or when the cognitive radio cell operates in an FDD system, an uplink channel and a downlink channel in the cognitive radio cell occupy one or more sub-bands respectively.

6. A network device applicable to a radio cognitive system, wherein the network device comprises at least a memory and a processor communicating with the memory, and the memory stores a dividing instruction, a transmitting instruction, a silence instruction, and a sensing instruction, executable by the processor;

the dividing instruction is configured to instruct to divide frequency band resources into a plurality of sub-bands;

the transmitting instruction is configured to instruct to notify respective cognitive radio cells of the division into the sub-bands, and a corresponding time-frequency pattern of silence periods, determined in response to the dividing instruction;

the silence instruction is configured to instruct to have the respective cognitive radio cells silent in sub-bands, where the cognitive radio cells operate, according to silence period temporal locations of the respective sub-bands defined in the time-frequency pattern of silence periods; and the sensing instruction is configured to instruct to perform spectrum sensing on the respective sub-bands when silence is enforced in response to the silence instruction;

wherein the time-frequency pattern of silence periods comprises: a statically configured time-frequency pattern of silence periods; or a dynamically configured time-frequency pattern of silence periods; or a time-frequency pattern of silence periods configured in hybrid;

wherein the time-frequency pattern of silence periods defines silence period temporal locations of the respective sub-bands in at least one sensing periodicity; and the silence period temporal locations of the respective sub-bands do not overlap with each other;

wherein the silence instruction is configured to instruct;

when the time-frequency pattern of silence periods is a statically configured time-frequency pattern of silence periods and it is determined from the time-frequency pattern of silence periods that a current instance of time is a silence period temporal location corresponding to a sub-band or sub-bands where one or more cognitive radio cells operate, to have the cognitive radio cell or cells silent in an interval of time corresponding to the silence period temporal location in the sub-band or sub-bands where the cognitive radio cell or cells operate;

or the transmitting instruction is further configured to instruct to transmit to a cognitive radio cell a request for spectrum sensing on a sub-band where the cognitive radio cell operates; and the silence instruction is further configured, when the time-frequency pattern of silence periods is a dynamically configured time-frequency Pattern of silence periods and a request for spectrum sensing on a sub-band, where a cognitive radio cell operates, has been transmitted to the cognitive radio cell in response to the transmitting instruction, to instruct to determine from the time-frequency pattern of silence periods one or more silence period temporal locations corresponding to the sub-band after a current instance of time; and to instruct to have the cognitive radio cell silent in an interval or intervals of time, corresponding to the one or more silence period temporal locations, in the sub-band where the cognitive radio cell operates; and wherein when the silence instruction determines from the time-frequency pattern of silence periods that the current instance of time is a silence period temporal location corresponding to a sub-band where a cognitive radio cell operates, if a request for spectrum sensing on the sub-band has not been previously transmitted to the cognitive radio cell in response to the transmitting instruction, then the silence instruction instructs to give up having the cognitive radio cell silent in an interval of time corresponding to the silence period temporal location in the sub-band where the cognitive radio cell operates, have the cognitive radio cell continue with normal operation in the sub-band;

or the transmitting instruction is further configured to instruct to transmit to a cognitive radio cell a request for spectrum sensing on a sub-band where the cognitive radio cell operates; and the silence instruction is further configured, when the time-frequency pattern of silence periods is a time-frequency pattern of silence periods configured in hybrid, to instruct to identify a dynamic sensing periodicity configured in the hybrid configuration scheme, and when it is instructed that it is determined from the time-frequency pattern of silence periods that the current instance of time is a silence period temporal location outside of the dynamic sensing periodicity corresponding to a sub-band where a cognitive radio cell operates, to instruct to have the cognitive radio cell silent in an interval of time corresponding to the silence period temporal location in the sub-band where the cognitive radio cell operates;

when a request for spectrum sensing on a sub-band, where a cognitive radio cell operates, is transmitted to the cognitive radio cell in response to the transmitting instruction, to instruct to determine from the time-frequency pattern of silence periods one or more silence period temporal locations in the dynamic sensing periodicity corresponding to the sub-band after a current instance of time, and to instruct to have the cognitive radio cell silent in an interval or intervals of time corresponding to the one or more silence period temporal locations in the sub-band where the cognitive radio cell operates; and when it is instructed that it is determined from the time-frequency pattern of silence periods that the current instance of time is a silence period temporal location in the dynamic sensing periodicity corresponding to a sub-band or sub-bands where one or more cognitive radio cells operate, and a request for spectrum sensing on the sub-band or sub-bands has not been previously transmitted to the cognitive radio cell or cells in response to the transmitting instruction, to instruct to give up having the cognitive radio cell or cells silent in an interval of time corresponding to the silence period temporal location in the sub-band or sub-bands where the cognitive radio cell or cells operate, have the cognitive radio cell or cells continue with normal operation in the sub-band or sub-bands.

7. The network device of claim 6, wherein the dividing instruction is configured to instruct:
to divide the frequency band resources into the plurality of sub-bands according to preset parameters related to the time-frequency pattern of silence periods and to notify the respective cognitive radio cells of the division into the sub-bands and the corresponding time-frequency pattern of silence periods; or
to obtain the parameters related to the time-frequency pattern of silence periods by receiving a control message transmitted by a centralized logical entity, to divide the frequency band resources into the plurality of sub-bands according to the parameters related to the time-frequency pattern of silence periods and to notify the respective cognitive radio cells of the division into the sub-bands and the corresponding time-frequency pattern of silence periods; and wherein
the parameters related to the time-frequency pattern of silence periods comprise at least a periodicity of silence periods, widths of the sub-bands, starting locations of the silence periods corresponding to the respective sub-bands, and ending locations of the silence periods corresponding to the respective sub-bands.

8. A method for spectrum sensing in a cognitive radio system, wherein the method comprises the operations of:

obtaining, by respective cognitive radio cells, division into sub-bands and a corresponding time-frequency pattern of silence periods; and enforcing, by the respective cognitive radio cells, silence in sub-bands, where the cognitive radio cells operate, according to silence period temporal locations of respective sub-bands defined in the corresponding time-frequency pattern of silence period to perform spectrum sensing on the corresponding sub-bands;

wherein the time-frequency pattern of silence periods comprises: a statically configured time-frequency pattern of silence periods; or a dynamically configured time-frequency pattern of silence periods; or a time-frequency pattern of silence periods configured in hybrid;

wherein the time-frequency pattern of silence periods defines silence period temporal locations of the respective sub-bands in at least one sensing periodicity; and the silence period temporal locations of the respective sub-bands do not overlap with each other;

wherein when the time-frequency pattern of silence periods is a statically configured time-frequency pattern of silence periods, enforcing, by the respective cognitive radio cells, silence in the sub-bands, where the cognitive radio cells operate, according to the silence period temporal locations of the respective sub-bands defined in the corresponding time-frequency pattern of silence period comprises:

when a cognitive radio cell determines from the time-frequency pattern of silence periods that a current instance of time is a silence period temporal location corresponding to a sub-band where the cognitive radio cell operates, enforcing, by the cognitive radio cell, silence in an interval of time corresponding to the silence period temporal location in the sub-band where the cognitive radio cell operates;

or when the time-frequency pattern of silence periods is a dynamically configured time-frequency pattern of silence periods, enforcing, by the respective cognitive radio cells, silence in the sub-bands, where the cognitive radio cells operate, according to the silence period temporal locations of the respective sub-bands defined in the corresponding time-frequency pattern of silence period comprises:

when a cognitive radio cell receives a request for spectrum sensing on a sub-band where the cognitive radio cell operates, determining by the cognitive radio cell from the time-frequency Pattern of silence periods one or more silence period temporal locations corresponding to the sub-band after a current instance of time; and enforcing, by the respective cognitive radio cells, silence in an interval or intervals of time corresponding to the one or more silence period temporal locations in the sub-band where the cognitive radio cell operates; and wherein when a cognitive radio cell determines from the time-frequency pattern of silence periods that the current instance of time is a silence period temporal location corresponding to a sub-band where the cognitive radio cell operates, if the cognitive radio cell has not previously received a request for spectrum sensing on the sub-band, then continuing by the cognitive radio cell with normal operation in the sub-band;

or when the time-frequency pattern of silence periods is a time-frequency pattern of silence periods configured in hybrid, enforcing, by the respective cognitive radio cells, silence in the sub-bands, where the cognitive radio cells operate, according to the silence period temporal locations of the respective sub-bands defined in the corresponding time-frequency pattern of silence period comprises:

identifying by a cognitive radio cell a dynamic sensing periodicity configured in the hybrid configuration scheme;

when a cognitive radio cell determines from the time-frequency pattern of silence periods that a current instance of time is a silence period temporal location outside of the dynamic sensing periodicity corresponding to a sub-band where the cognitive radio cell operates, enforcing, by the cognitive radio cell, silence in an interval of time corresponding to the silence period temporal location in the sub-band where the cognitive radio cell operates;

when the cognitive radio cell receives a request for spectrum sensing on a sub-band where the cognitive radio cell operates, determining by the cognitive radio cell from the time-frequency pattern of silence periods one or more silence period temporal locations in the dynamic sensing periodicity corresponding to the sub-band after the current instance of time, and enforcing, by the cognitive radio cell, silence in an interval or intervals of time corresponding to the one or more silence period temporal locations in the sub-band where the cognitive radio cell operates; and when the cognitive radio cell determines from the time-frequency pattern of silence periods that the current instance of time is a silence period temporal location in the dynamic sensing periodicity corresponding to a sub-band where the cognitive radio cell operates, if the cognitive radio cell has not previously received a request for spectrum sensing on the sub-band, then continuing by the cognitive radio cell with normal operation in the sub-band.

9. The method of claim 8, wherein obtaining by the respective cognitive radio cells the corresponding division into sub-bands and the corresponding time-frequency pattern of silence periods comprises:

receiving by the respective cognitive radio cells the division into the sub-bands and the corresponding time-frequency pattern of silence periods notified of by a cognitive radio spectrum sensing system, wherein the cognitive radio spectrum sensing system divides band resources into the plurality of sub-bands; or determining by the respective cognitive radio cells the division into the sub-bands and the corresponding time-frequency pattern of silence periods directly under a preset rule.

10. The method of claim 9, wherein obtaining by the respective cognitive radio cells the corresponding division into sub-bands and the corresponding time-frequency pattern of silence periods comprises:

receiving by the respective cognitive radio cells the division into the sub-bands and the corresponding time-frequency pattern of silence periods notified of by the cognitive radio spectrum sensing system, wherein the cognitive radio spectrum sensing system divides the frequency band resources into the plurality of sub-bands according to preset parameters related to the time-frequency pattern of silence periods; or receiving by the respective cognitive radio cells the division into the sub-bands and the corresponding time-frequency pattern of silence periods notified of by the cognitive radio spectrum sensing system, wherein the cognitive radio spectrum sensing system obtains the parameters related to the time-frequency pattern of silence periods by receiving a control message transmitted by a centralized logical entity and divides the frequency band resources into the plurality of sub-bands according to the parameters related to the time-frequency pattern of silence periods; or dividing by the respective cognitive radio cells the frequency band resources into the plurality of sub-bands according to the preset parameters related to the time-frequency pattern of silence periods and determining the corresponding time-frequency pattern of silence periods; or obtaining by the respective cognitive radio cells the parameters related to the time-frequency pattern of silence periods by receiving the control message transmitted by the centralized logical entity, dividing the frequency band resources into the plurality of sub-bands according to the parameters related to the time-frequency pattern of silence periods and determining the corresponding time-frequency pattern of silence periods; and wherein:

the parameters related to the time-frequency pattern of silence periods comprise at least a periodicity of silence periods, widths of the sub-bands, starting locations of the silence periods corresponding to the respective sub-bands, and ending locations of the silence periods corresponding to the respective sub-bands;

wherein the frequency band resources are divided into the sub-bands under the following rules:

the respective sub-bands as a result of the division do not intersect with each other; and a union of resources corresponding to the respective sub-bands as a result of the division is frequency band resources over which the respective cognitive radio cell may operate; and wherein the widths of the respective sub-bands as a result of the division are the same or different.

11. The method of claim 8, wherein temporal lengths of the silence periods corresponding to the silence period temporal locations of the respective sub-bands are the same or different.

12. The method of claim 8, wherein enforcing, by the respective cognitive radio cells, silence in the sub-bands, where the cognitive radio cells operate, according to the silence period temporal locations of the respective sub-bands defined in the corresponding time-frequency pattern of silence period comprises:

stopping by the cognitive radio cells a message from being transmitted in uplink channels and downlink channels corresponding to the sub-bands in intervals of time corresponding to the silence period temporal locations of the sub-bands.

13. The method of claim 8, wherein:

when the cognitive radio cell operates in a multi-carrier system, respective carriers occupy one or more sub-bands respectively; or wherein the respective cognitive radio cells are isomorphic or heterogeneous cells; or when the cognitive radio cell operates in a TDD system, the cognitive radio cell occupies one or more sub-bands; or when the cognitive radio cell operates in an FDD system, the cognitive radio cell occupies one or more sub-bands; or when the cognitive radio cell operates in an FDD system, an uplink channel and a downlink channel in the cognitive radio cell occupy one or more sub-bands respectively.

14. The method of claim 8, wherein performing spectrum sensing on the corresponding sub-bands comprises:

performing, by the cognitive radio spectrum sensing system, spectrum sensing on the corresponding sub-bands; or performing, by the respective cognitive radio cells, spectrum sensing on the corresponding sub-bands.

15. A network device applicable to a radio cognitive system, wherein the network device comprises at least a memory and a processor communicating with the memory, and the memory stores a obtaining instruction, and a silence instruction, executable by the processor, and wherein:

the obtaining instruction is to configured to instruct to obtain division into sub-bands and a corresponding time-frequency pattern of silence periods; and the silence instruction is configured to instruct to enforce silence in a sub-band, where a cognitive radio cell operates, according to silence period temporal locations of the respective sub-bands defined in the corresponding time-frequency pattern of silence periods to perform spectrum sensing on the corresponding sub-band;

wherein the time-frequency pattern of silence periods comprises: a statically configured time-frequency pattern of silence periods; or a dynamically configured time-frequency pattern of silence periods; or a time-frequency pattern of silence periods configured in hybrid;

wherein the time-frequency pattern of silence periods defines silence period temporal locations of the respective sub-bands in at least one sensing periodicity; and the silence period temporal locations of the respective sub-bands do not overlap with each other;

wherein the silence instruction is configured to instruct:

when the time-frequency pattern of silence periods is a statically configured time-frequency pattern of silence periods and it is determined from the time-frequency pattern of silence periods that a current instance of time is a silence period temporal location corresponding to a sub-band where the cognitive radio cell operates, to have the cognitive radio cell silent in an interval of time corresponding to the silence period temporal location in the sub-band where the cognitive radio cell operates;

or wherein the obtaining instruction is further configured to instruct to receive a request transmitted by the cognitive radio spectrum sensing system for spectrum sensing on a sub-band where the cognitive radio cell operates; and the silence instruction is further configured, when the time-frequency pattern of silence periods is a dynamically configured time-frequency pattern of silence periods and a request for spectrum sensing on a sub-band where the cognitive radio cell operates is received in response to the obtaining instruction, to determine from the time-frequency pattern of silence periods one or more silence period temporal locations corresponding to the sub-band after a current instance of time; and to instruct to have the cognitive radio cell silent in an interval or intervals of time corresponding to the one or more silence period temporal locations in the sub-band where the cognitive radio cell operates; and wherein when the silence instruction determines from the time-frequency pattern of silence periods that the current instance of time is a silence period temporal location corresponding to a sub-band where the cognitive radio cell operates, if a request for spectrum sensing on the sub-band has not been previously obtained in response to the obtaining instruction, then the silence instruction instructs to give up having the cognitive radio cell silent in the sub-band where the cognitive radio cell operates but have the cognitive radio cell continue with normal operation in the sub-band;

or wherein the obtaining instruction is further configured to instruct to receive a request transmitted by the cognitive radio spectrum sensing system for spectrum sensing on a sub-band where the cognitive radio cell operates; and the silence instruction is further configured, when the time-frequency pattern of silence periods is a time-frequency pattern of silence periods configured in hybrid, to instruct to identify a dynamic sensing periodicity configured in the hybrid configuration scheme, and when it is instructed that it is determined from the time-frequency pattern of silence periods that a current instance of time is a silence period temporal location outside of the dynamic sensing periodicity corresponding to a sub-band where a cognitive radio cell operates, to have the cognitive radio cell silent in an interval of time corresponding to the silence period temporal location in the sub-band where the cognitive radio cell operates;

when a request for spectrum sensing on a sub-band where the cognitive radio cell operates is received in response to the obtaining instruction, to instruct to determine from the time-frequency pattern of silence periods one or more silence period temporal locations in the dynamic sensing periodicity corresponding to the sub-band after the current instance of time, and to have the cognitive radio cell silent in an interval or intervals of time corresponding to the one or more silence period temporal locations in the sub-band where the cognitive radio cell operates; and when it is instructed that it is determined from the time-frequency pattern of silence periods that the current instance of time is a silence period temporal location in the dynamic sensing periodicity corresponding to a sub-band where the cognitive radio cell operates, and a request for spectrum sensing on the sub-band has not been previously received in response to the obtaining instruction, the silence instruction instructs to give up having the cognitive radio cell silent in the sub-band where the cognitive radio cell operates but have the cognitive radio cell or cells continue with normal operation in the sub-band or sub-bands.

16. The network device of claim 15, wherein the obtaining instruction is configured to instruct:

to obtain the division into the sub-bands and the corresponding time-frequency pattern of silence periods from received information notified of by a cognitive radio spectrum sensing system, wherein the cognitive radio spectrum sensing system divides frequency band resources into the plurality of sub-bands; or to determine the division into the sub-bands and the corresponding time-frequency pattern of silence periods directly under a preset rule.

* * * * *